(12) United States Patent
Woods et al.

(10) Patent No.: US 7,892,476 B2
(45) Date of Patent: Feb. 22, 2011

(54) METHOD AND APPARATUS FOR PROVIDING AND EXHAUSTING COMPRESSED AIR AT A PLURALITY OF POINTS OF USE IN A BLOW MOULDING DEVICE

(76) Inventors: Kevin Woods, Roton House, Ellen Street, Oldham, OL9 6QR (GB); Andrew Taylor, Roton House, Ellen Street, Oldham, OL9 6QR (GB)

( * ) Notice: Subject to any disclaimer, the term of this patent is extended or adjusted under 35 U.S.C. 154(b) by 1130 days.

(21) Appl. No.: 10/490,915

(22) PCT Filed: Sep. 27, 2002

(86) PCT No.: PCT/GB02/04412
§ 371 (c)(1),
(2), (4) Date: Mar. 26, 2004

(87) PCT Pub. No.: WO03/028979
PCT Pub. Date: Apr. 10, 2003

(65) Prior Publication Data
US 2004/0265416 A1    Dec. 30, 2004

(30) Foreign Application Priority Data
Sep. 28, 2001  (GB) ................. 0123317.0

(51) Int. Cl.
*B29C 49/58*   (2006.01)
*B29C 49/62*   (2006.01)

(52) U.S. Cl. .............. 264/523; 264/297.8; 425/535; 425/538

(58) Field of Classification Search ............. 264/39, 264/523, 297.5, 297.8; 425/535, 538
See application file for complete search history.

(56) References Cited

U.S. PATENT DOCUMENTS

| | | | |
|---|---|---|---|
| 2,375,763 A * | 5/1945 | Blais ........................... | 29/33 D |
| 4,394,333 A | 7/1983 | Fukushima et al. ........... | 264/37 |
| 5,648,026 A | 7/1997 | Weiss .......................... | 264/37 |
| 6,855,289 B2 * | 2/2005 | Krishnakumar et al. ..... | 264/516 |

FOREIGN PATENT DOCUMENTS

| | | |
|---|---|---|
| EP | 0 560 522 A1 | 9/1993 |
| EP | 862984 A1 * | 9/1998 |
| EP | 0919 355 A1 | 6/1999 |
| GB | 2 380 967 | 4/2003 |

* cited by examiner

*Primary Examiner*—Robert B Davis
(74) *Attorney, Agent, or Firm*—Thomas, Kayden, Horstemeyer & Risley, LLP.

(57) ABSTRACT

A blow moulding device configured to provide and exhaust compressed air at a plurality of points of use, the device comprising a compressed air source for providing compressed air at the points of use, a compressed air manifold to allow a transporting of the compressed air to the points of use, a plurality of exhaust valves positioned at the points of use for exhausting the compressed air, and a plurality of valves to effect the providing and exhausting of the compressed air at the points of use.

36 Claims, 19 Drawing Sheets

METHOD AND APPARATUS FOR PROVIDING AND EXHAUSTING COMPRESSED AIR AT A PLURALITY OF POINTS OF USE IN A BLOW MOULDING DEVICE

FIELD OF THE INVENTION

The present invention relates to an apparatus and a method for blow moulding materials at a plurality of points of use using compressed air.

BACKGROUND TO THE INVENTION

In order to provide reusable or disposable receptacles for the storage of, for example, food stuffs or beverages, it is commonly known to employ the established process of blow moulding. The process, involving the use of compressed air, is utilized to deform or blow both low and high density plastics (LDP and HDP), polyethene (PET) and even glass into disposable milk bottles, food stuff containers, drink containers etc.

With reference to FIG. 1, the process of blow moulding utilizes a compressed air source 100 being connected to a compressed air manifold 101, being operable to transport the compressed air to the point of use 102 within a mould 103. In the case where a plastic material is deformed or blown at the point of use, the molten plastic is first dripped onto a needle 104 from where the compressed air emerges. Air is forced into the molten plastic which expands up to the extremity within the mould, thereby forming the receptacle.

The compressed air within the manifold 101 and mould 102 is then exhausted prior to the opening of mould 103 to remove the formed receptacle, ready for a repeat cycle. It is known in the art to control the blow moulding process using a suitable programmable logic circuit (PLC) thereby negating the need for human intervention and increasing the efficiency of the process with regard to compressed air consumption and blow moulding cycle time.

Further, multiple points of use being positioned on a central manifold, have been found to provide a more efficient blow moulding process as detailed with reference to FIG. 2. Compressed air is supplied into the manifold 101 from the compressed air source 100 into each mould 103 at each point of use 102. It is known to utilize valves 200 to control the transporting and providing of compressed air to the points of use. A feature common to all prior art blow moulding apparatus is the utilization and positioning of an exhaust valve 201 within the blow moulding apparatus. A typical prior art blow moulding device comprises an exhaust 201 being connected directly to the manifold 101 via a suitable valve 202. Such that, following the deforming of the material at the points of use 102 to form the receptacles, compressed air from within each mould 103 and the entire manifold 101 is exhausted at exhaust 201 via the opening of valve 202. Moulds 103 can then be opened to remove the formed receptacles and the blow moulding cycle repeated.

The inventors through familiarization with the blow moulding apparatus and method, have realized various problems and disadvantages with the employment of an exhaust valve connected directly to the manifold. The identified problems include:

As a result of compressed air within the moulds and the manifold being exhausted, compressed air consumption for any given blow moulding cycle is excessive due to the exhausting of compressed air from within the manifold. Moreover, the problem is exaggerated if the manifold is constructed from relatively large internal diameter tubing, as is found in the art.

The cycle time of any single blow moulding cycle is extended due to the requirement for the exhausting of compressed air from within the manifold. The volume of compressed air within the manifold is considerable and requires additional time for exhausting with respect to the volume of compressed air within each mould.

The inventors have realized a need for a blow moulding apparatus and method that utilizes a plurality of exhaust points being positioned at each point of use (in close proximity to the mould), such that a blow moulding device is configured to exhaust compressed air from within the mould cavity only without resort to the unnecessary exhausting of large volumes of compressed air within the manifold. As such, compressed air consumption for any given blow moulding cycle may be reduced in addition to a reduction in the cycle time as a result of the capability to exhaust at the points of use, whereby a comparatively small volume of compressed air is exhausted. An improved blow moulding device is described herein below.

SUMMARY OF THE INVENTION

The inventors, through specific implementations of the present invention provide an improved blow moulding device capable of reduced compressed air consumption and cycle time, with respect to those found in the art. A blow moulding device is provided with a plurality of exhaust points positioned in close proximity to a plurality of points of use, such that, following the deforming or blowing of material at the plurality of points of using the compressed air, only compressed air contained within each mould cavity is exhausted in contrast to the exhausting system as found in the art.

The inventors, through a series of comparative testing, have found improvements in compressed air consumption over blow moulding devices utilizing a single exhaust point of approximately 33% per pint of blow moulded plastic. Moreover, the inventors have realized a reduction in the cycle time of approximately 0.4 seconds for a device having 8 points of use. This represents a considerable saving given the large number of blow moulding cycles repeated in any one manufacturing day.

According to one specific implementation of the present invention, the inventors provide a blow moulding device being operable to blow mold material at the high compressed air pressure range ($2.5 \times 10^6$ Pa to $4.5 \times 10^6$ Pa). According to a second specific implementation of the present invention the inventors provide a blow moulding device capable of blow moulding a material using compressed air at a relatively low pressure of $5.5 \times 10^5$ Pa and, according to a third specific implementation of the present invention the inventors provide a blow moulding device capable of blow moulding a material with compressed air at two substantially different pressure ranges or values these being, blow moulding at a first pressure range of $1 \times 10^5$ Pa to $5 \times 10^5$ Pa, and at a second pressure of approximately $5.5 \times 10^5$ Pa. All three specific implementations utilizing a plurality of exhaust points positioned in close proximity to the plurality of points of use, thereby negating the requirement for the exhausting of compressed air from within a single manifold or multiple manifolds.

According to a first aspect of the present invention there is provided a blow moulding device configured to provide and exhaust compressed air at a plurality of points of use, said device comprising:

a compressed air source for providing compressed air at said points of use;

a plurality of exhaust valves positioned at said points of use for exhausting said compressed air;

a blow system to reduce a blow moulding cycle time and to provide a transporting and effect a providing of said compressed air from said compressed air source to said points of use, said blow system comprising:

a compressed air manifold to allow a transporting of said compressed air to said points of use;

a plurality of valves to effect said providing and exhausting of said compressed air; and at least one control valve to control said plurality of valves.

According to a second aspect of the present invention there is provided a blow moulding device configured to provide and exhaust compressed air at a plurality of points of use, said device comprising:

a first and a second compressed air source for providing compressed air to said points of use;

a plurality of exhaust valves positioned at said points of use for exhausting said compressed air;

an initial blow system to reduce a blow moulding cycle time and to provide a transporting and effect a providing of said compressed air from said first compressed air source to said points of use;

a main blow system to reduce a blow moulding cycle time and to provide a transporting and effect a providing of said compressed air from second compressed air source to said points of use, said initial blow system and said main blow system each comprising:

a compressed air manifold to allow a transporting of said compressed air to said points of use;

a plurality of valves to effect said providing and exhausting of said compressed air; and at least one control valve to control said plurality of valves.

According to a third aspect of the present invention there is provided a method of providing and exhausting compressed air at a plurality of points of use, said method comprising the steps of:

providing compressed air at said points of use from a compressed air source;

exhausting said compressed air at said points of use using a plurality of exhaust valves positioned at said points of use;

transporting said compressed air to said points of use using a compressed air manifold of a blow system;

effecting said providing and exhausting of said compressed air at said points of use using a plurality of valves of said blow system;

controlling said plurality of valves using at least on solenoid control valve of said blow system; and wherein a blow moulding cycle time is reduced using said blow system.

According to a fourth aspect of the present invention there is provided a method of providing and exhausting compressed air at a plurality of points of use, said method comprising the steps of:

providing compressed air at said points of use from a first and a second compressed air source;

exhausting said compressed air at said points of use using a plurality of exhaust valves positioned at said points of use;

transporting said compressed air to said points of use using a compressed air manifold of an initial blow system and a compressed air manifold of a main blow system;

effecting said providing and exhausting of said compressed air at said points of use using a plurality of valves of said initial blow system and a plurality of valves of said main blow system;

controlling said plurality of valves of said initial blow system using at least one solenoid control valve of said initial blow system and controlling said plurality of valves of said main blow system using at least one solenoid control valve of said main blow system;

wherein a blow moulding cycle time is reduced using said initial blow system and said main blow system.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
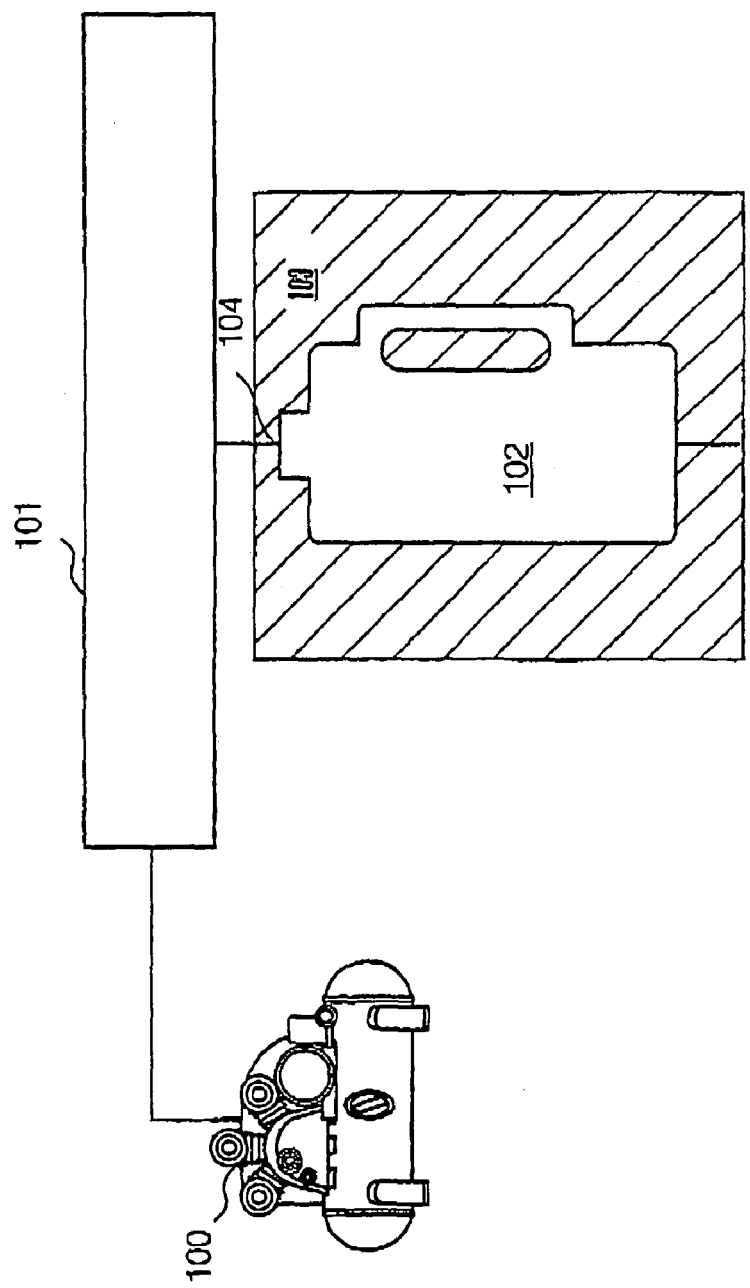
FIG. 1 illustrates a prior art blow moulding device having a single point of use and single mould cavity.
Figure 2:
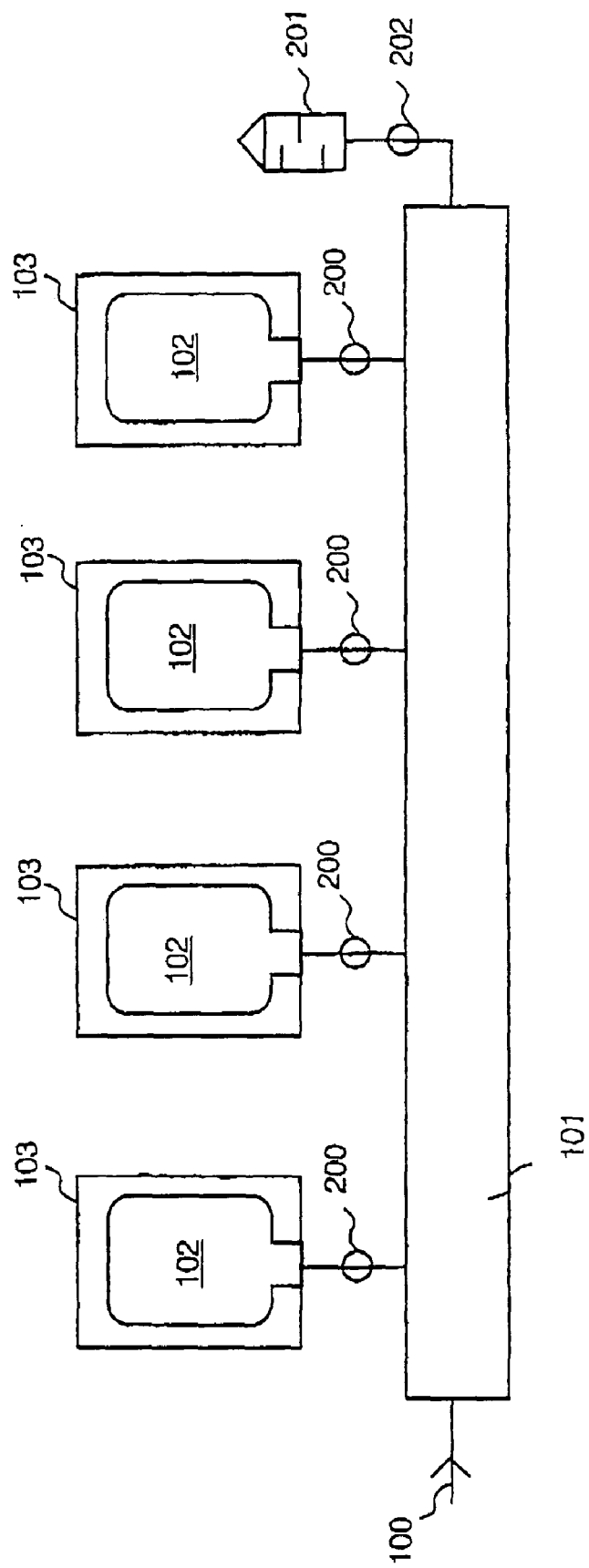
FIG. 2 illustrates a prior art blow moulding device having a plurality of points of use and mould cavities together with a single exhaust point.
Figure 3:
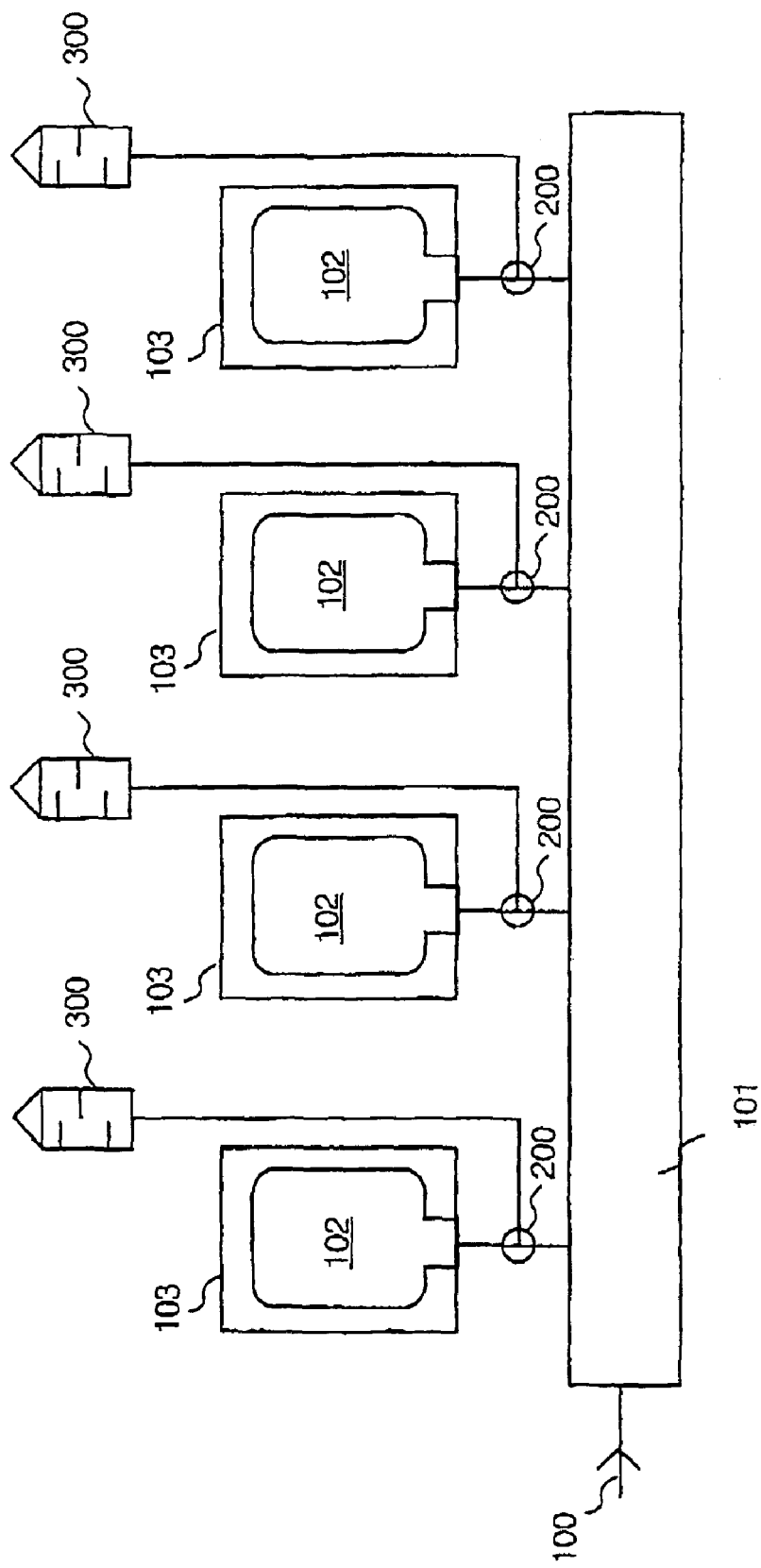
FIG. 3 illustrates the blow moulding device according to one aspect of the present invention having a plurality of exhaust points positioned in close proximity to a plurality of points of use on a manifold.

Referring to FIG. 3 there is illustrated a blow moulding device having a plurality of exhaust points positioned in close proximity to a plurality of points of use according to one embodiment of the present invention. The device, according to a specific embodiment, comprises a single manifold 101 into which compressed air, from a compressed air source, is supplied. Connected directly to the manifold are a plurality of points of use 102 positioned within a plurality of moulds 103. Compressed air is provided to the moulds via valves 200, such that following the forming of a receptacle, (e.g. plastic material), through the blowing of compressed air into the mould cavity, compressed air from within the cavity is exhausted via the plurality of exhaust valves 300. Through the utilization of a plurality of exhaust valves 300 and the plurality of valves 200 compressed air within the manifold 101 is not exhausted.

Figure 4:
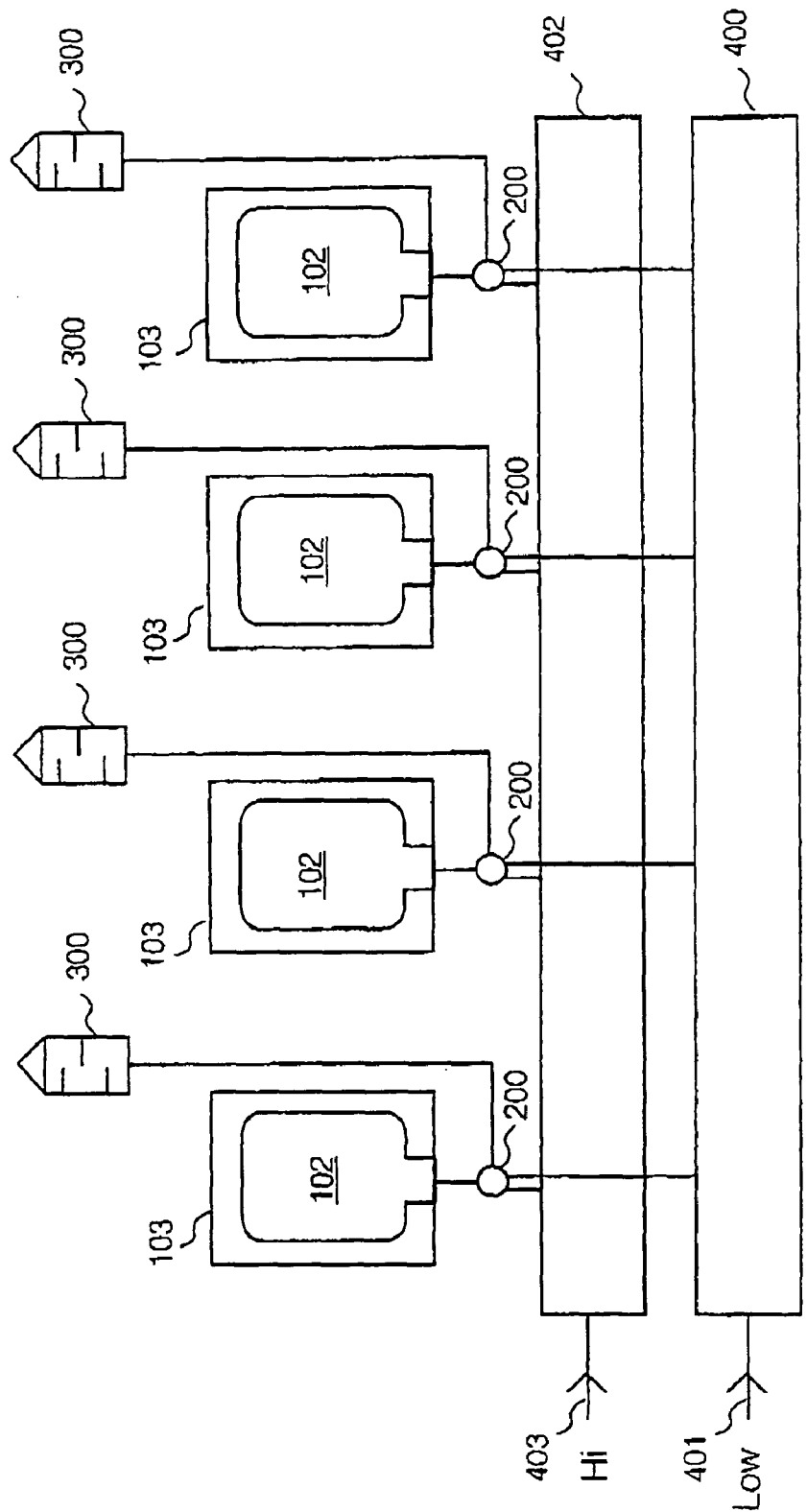
FIG. 4 illustrates a blow moulding device according to one aspect of the present invention having a plurality of exhaust points located in close proximity to a plurality of points of use, the points of use being connected to a first and a second manifold.

Referring to FIG. 4 there is illustrated a blow moulding device according to the specific implementation of the present invention. The device according to the specific implementation comprises the plurality of moulds 103 within which are positioned a plurality of points of use 102 being connected to a plurality of valves 200. The plurality of valves 200 are connected to a plurality of exhaust valves 300 so as to provide a plurality of exhaust points being located in close proximity to the plurality of points of use.

The points of use 102 are connected to a first manifold or initial blow manifold 400 being supplied with compressed air 401 of relatively low pressure ($5.5 \times 10^5$ Pa). Additionally, the plurality of points of use a reconnected to a second or main blow manifold 402, being supplied with compressed air at a relatively high pressure, being within the range $2.5 \times 10^6$ Pa to $4.5 \times 10^6$ Pa. According to the specific implementation of the present invention exhaust valves 300 are configured with silencers such that the exhausting of gas from within the mould cavities 102 does not give rise to excessive noise thereby avoiding violation of any health and safety legislation.

During an operative cycle of the device according to the specific implementation, compressed air from the first compressed air source 401 is provided to the points of use 102 via the initial blow manifold 400. The second compressed air source 403 then provides compressed air to the main blow manifold 402 and to the points of use thereby providing a main blow to the receptacle. The initial blow of compressed air into the molten material to form the receptacle, is sufficient to propel the molten material up to a region in close proximity to the inner walls of moulds 103. The main blow thereafter, and being at higher pressure, forces the material against the inner wall of moulds 103 so as to generate perfect or near perfect receptacles having outer dimensions corresponding to the inner walls of the plurality of moulds 103.

According to the specific implementation of the present invention, the device is configured for exhausting compressed air from within the moulds 103 and not exhausting compressed air from within the main blow or high pressure manifold 402, as is the current operation for blow moulding devices as found in the art.

Figure 5:
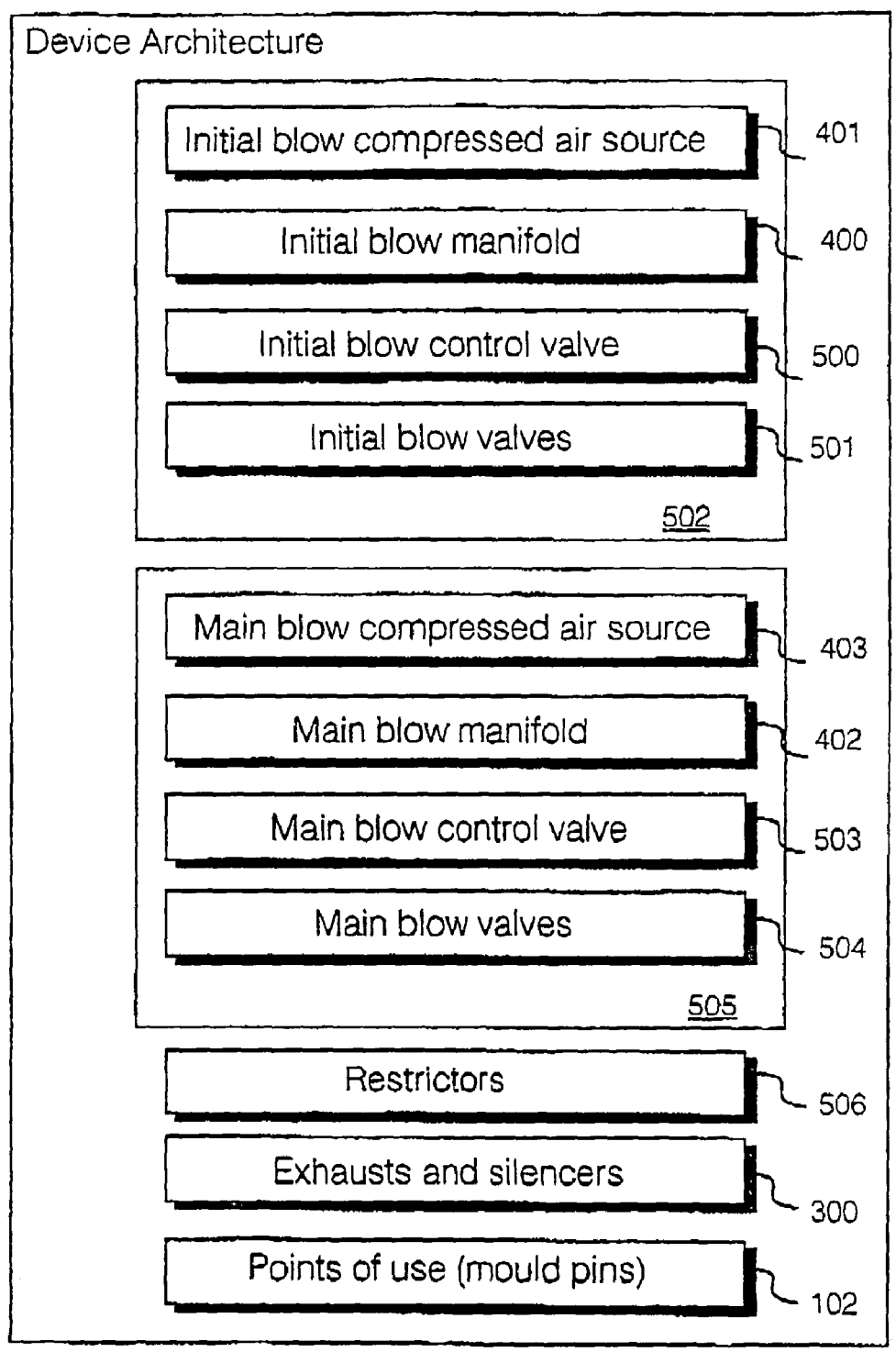
FIG. 5 illustrates a blow moulding device architecture according to one aspect of the present invention.

There is illustrated in FIG. 5 the architecture of the blow moulding device according to the specific implementation. The device according to the specific implementation comprises the initial blow compressed air source 401 being configured to supply air to an initial blow manifold 400, the initial blow manifold having at least one initial blow control valve 500 and a plurality of initial blow valves 501. Components 400, 401, 500 and 501 according to the specific implementation comprise an initial blow system to provide a transporting and effect a providing of compressed air from a compressed air source to a plurality of points of use 102. The device further comprises a main blow compressed air source 403 configured to supply compressed air to a main blow manifold 402, manifold 402 comprising at least one main blow control valve 503, being operative to control a plurality of main blow valves 504. Components 402, 403, 503 and 504 comprise a main blow system 505 to provide a transporting and effect a providing of compressed air from a compressed air source to the points of use 102. The device may further comprise a plurality of restrictor valves 506 configured to restrict the transporting of compressed air from the first compressed air source 401 to the initial blow system 502. The blow moulding device is configured for the exhausting of compressed air at the plurality of points of use using a plurality of exhaust valves 300, such exhaust valves being configured with silencers (e.g. sinted bronze silencers).

According to the specific implementation of the present invention the initial blow compressed air source 401 and the main blow compressed air source 403 may comprise any standard air compressor unit capable of supplying compressed air at, $1 \times 10^5$ Pa to $5 \times 10^5$ Pa, and $5.5 \times 10^5$ Pa, respectively. The initial blow and main blow manifolds 400 and 402, by way of example, comprise aluminum or stainless steel tubing of internal diameter in the range of 32 mm to 55 mm. The initial blow and main blow control valves may optionally comprise, by way of example, 3 and 4 directional solenoid valves being operable to control the plurality of initial blow and main blow valves, respectively. The initial blow and main blow valves may comprise by way of example, pilot operated ISO directional pneumatic valves. Restrictors 506 may comprise by way of example, unidirectional flow control valves. The exhaust valves being, by way of example, quick exhaust valves.

Figure 6:
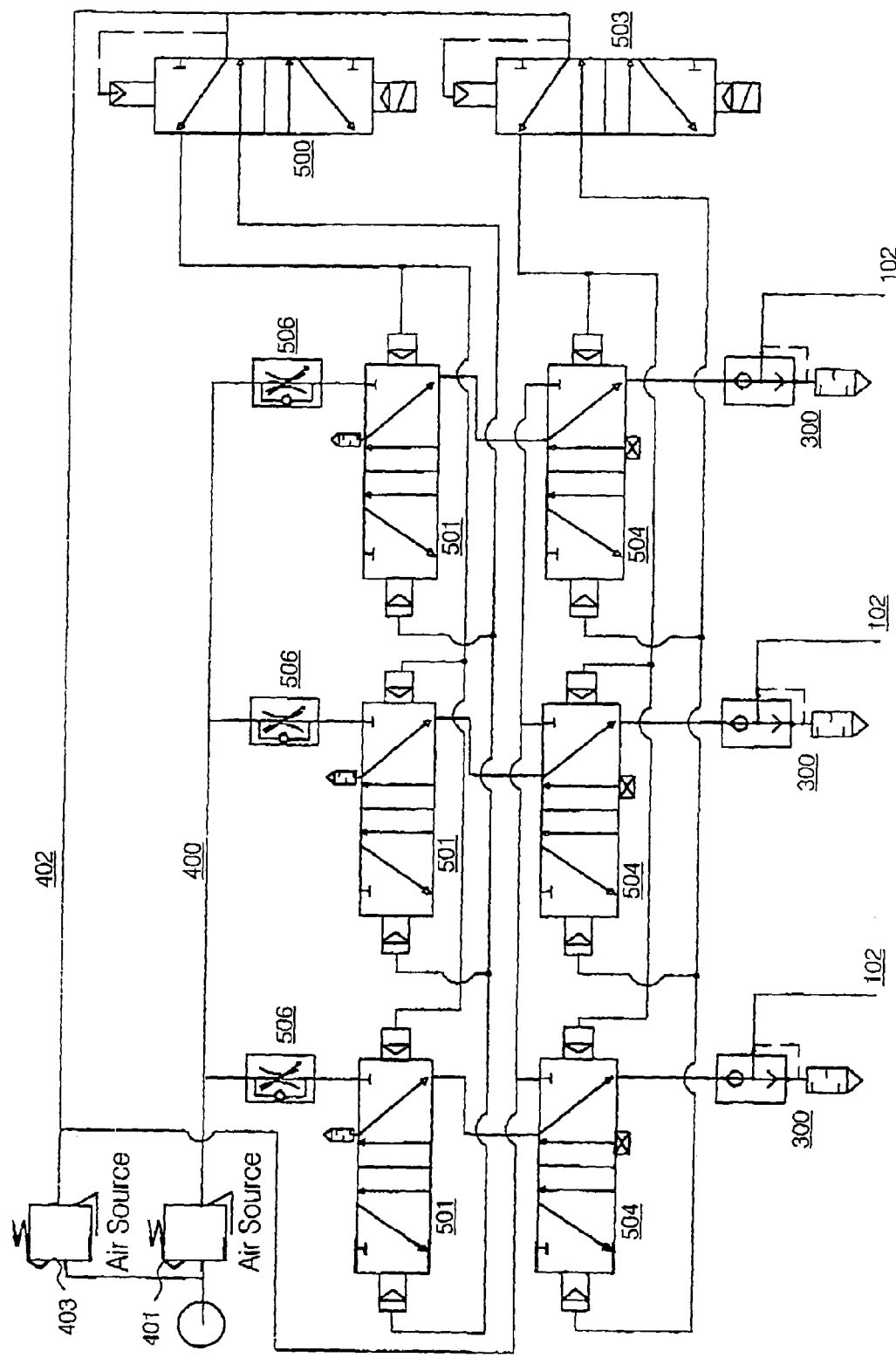
FIG. 6 illustrates a specific embodiment of the present invention having a plurality of valves and points of use.

With reference to FIG. 6 there is illustrated a plan view of the blow moulding device according to the specific implementation. Control valves 500 and 503 are controlled by a suitable PLC and the main blow compressed air source 403. Initial blow solenoid control valve 500 is configured to control a plurality of initial blow pilot operated valves 501 to effect the providing and exhausting of compressed air. Similarly, main blow solenoid control valve 503 is configured to control the plurality of main blow pilot operated valves 504 to effect the providing and exhausting of compressed air. Restrictors 506 are positioned between the first compressed air source 401 and the initial blow pilot operated valve 501. The initial blow manifold 400 comprises all connecting tubing between the first compressed air source 401 and initial blow pilot operated valves 501, the initial blow pilot operated valves 501 and initial blow solenoid control valve 500 up to the main blow pilot operated valves. The main blow manifold comprises all other tubing connecting, for example, the second compressed air source 403, the main blow control valve 503, the main blow pilot operated valves 504 up to the points of use 102.

The pilot operated valves 501 and 504 are controlled by the supply of compressed air to a first and a second side of each valve as illustrated in FIG. 6 using standard pneumatic symbolism as is employed in the art. Air flow through each pilot operated valve 501 and 504 may be provided or terminated by the energizing of control valves 500 and 503. The energizing of control valve 500 and 503 involving the supply of an electrical signal from the PLC, for example.

Figure 7:
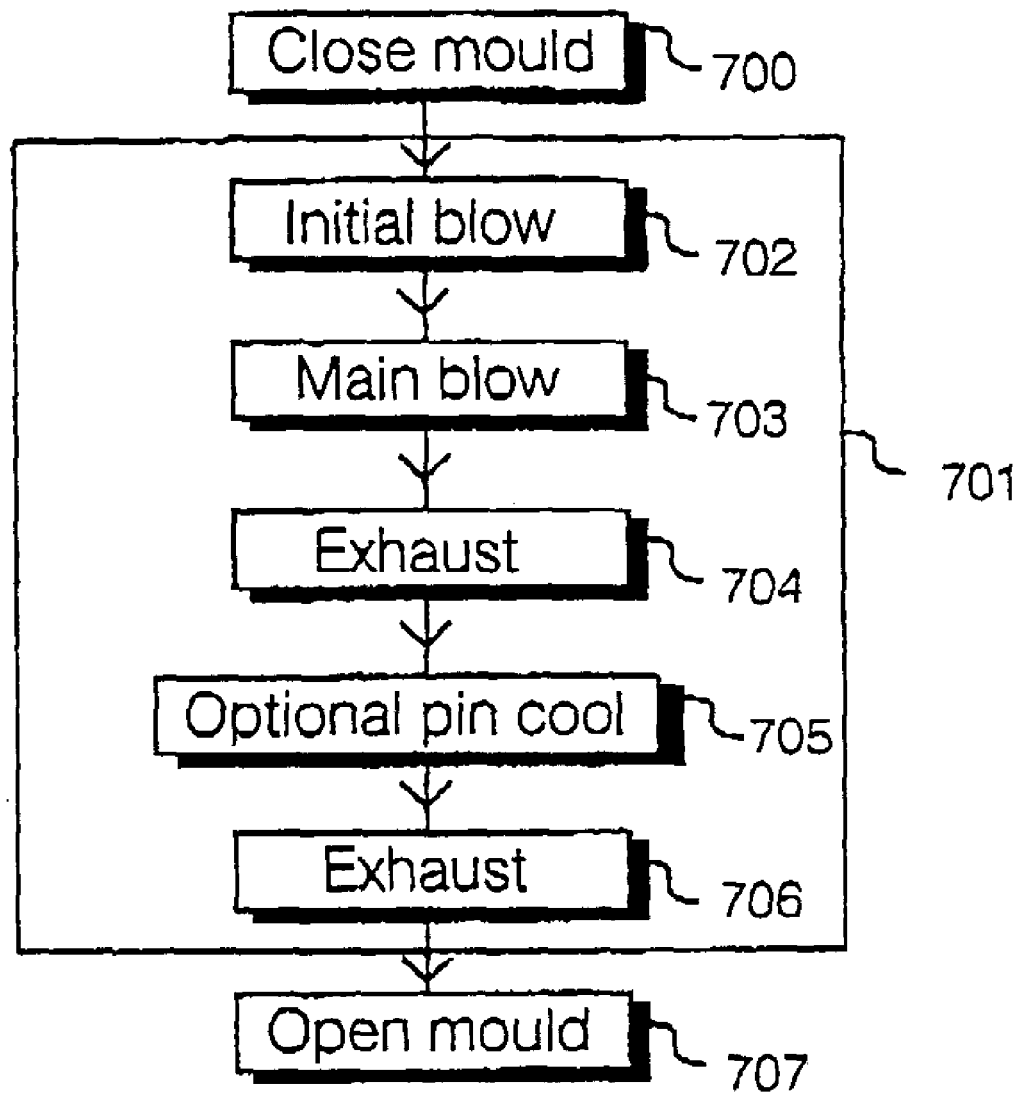
FIG. 7 illustrates a flow diagram detailing a specific implementation of the present invention.

Referring to FIG. 7 there is illustrated a flow diagram detailing the general operational stages of the blow moulding device according to the specific implementation. Initially, the mould 103 is closed around a blow moulding pin located at a point of use at stage 700. A molten material (e.g. plastic) is then fed onto the blow moulding pin and the blow moulding cycle initiated comprising stages 701. An initial blow is initiated at stage 702 involving the providing and transporting of compressed air from a compressed air source to the plurality of points of use. A main blow follows at stage 703 involving the providing and transporting of compressed air from a second compressed air source to the plurality of points of use. The compressed air within the plurality of mould cavities, in particular, within the newly formed receptacles, is exhausted at stage 704 via the plurality of exhaust points 300 located in close proximity to the plurality of points of use 102. An optional pin cool operation is then initiated at stage 705 involving the providing and transporting of further compressed air to the blow moulding pins, this further compressed air having the effect of cooling the pins which are heated due to the increase in volume experienced by the emergent compressed air entering the mould cavity. The compressed air provided for by the optional pin cool operation is exhausted at stage 706 via the same process as described at stage 704, both stages 704 and 706 involving the exhausting of compressed air from within the plurality of mould cavities and not the exhausting of compressed air within the blow moulding device manifold(s).

A typical cycle time 701 found in the art is between 7 to 10 seconds, such that the inventors provide a blow moulding device capable of a cycle time of less than 7 seconds. The mould is opened at stage 707 to allow access to the newly formed receptacle. Following the removing of the receptacle the mould is closed as stage 700 and the cycle repeated. Cycle 701 according to the specific implementation of the present invention is controlled by a PLC.

Figure 8:
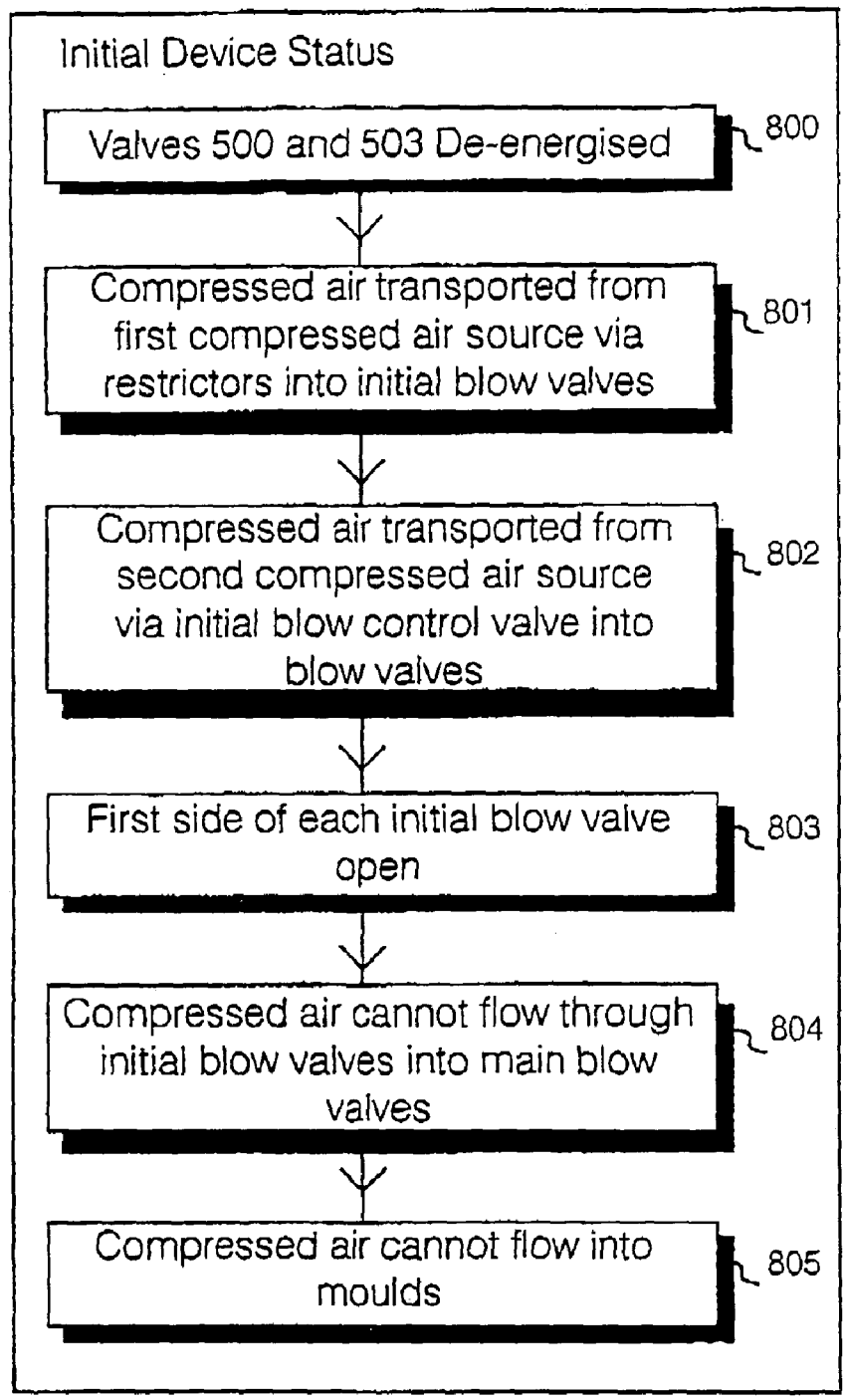
FIG. 8 illustrates the initial status of the blow moulding device according to a specific embodiment.

The initial blow moulding device status is illustrated in FIG. 8 according to the specific implementation. The initial and main blow control valves, 500 and 503, are de-energized at stage 800, in that no electrical signal is supplied to valves 500 or 503. Compressed air is transported from the first compressed air source 401 via restrictors 506 into the initial blow valves 501 at status 801. Compressed air is transported from the second compressed air source 403 via the initial blow control valve 500 into each initial blow valve 501 at status 802. As a consequence of compressed air at a pressure of approximately $5.5 \times 10^5$ Pa, being incident on a first side of each pilot operated initial blow valve 501, the first side of each initial blow valve is opened at status 803. As such, compressed air cannot flow through the initial blow valves into the so connected main blow valves 504 at status 804. Consequently, compressed air cannot flow into the plurality of moulds positioned around the plurality of points of use 102 at status 805.

Figure 9:
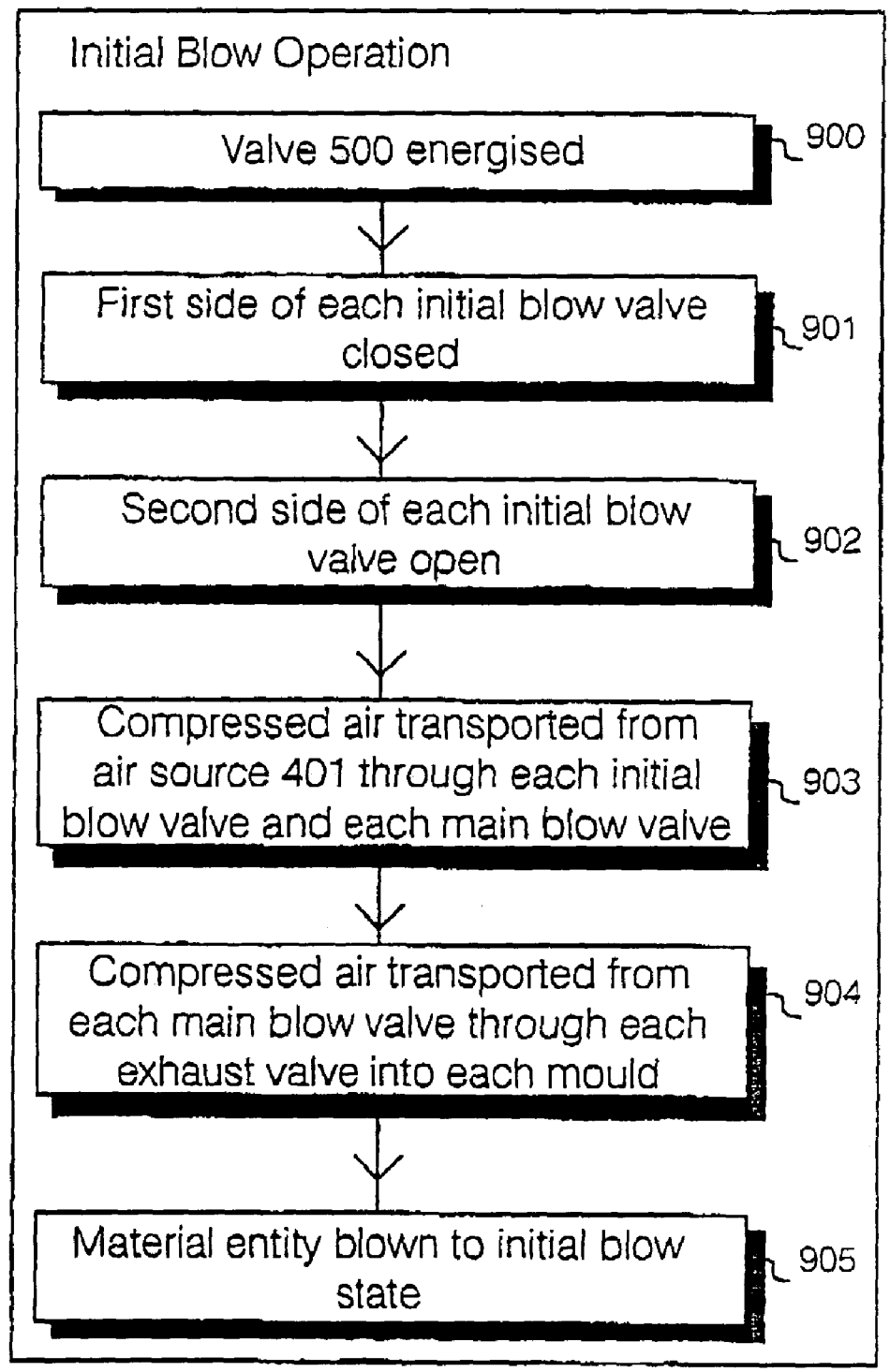
FIG. 9 illustrates an initial blow moulding operation according to one aspect of the present invention.

The initial blow operation of the blow moulding device according to the specific implementation is detailed with reference to FIG. 9. Control valve 500 is energized at stage 900 employing a suitable electrical signal generated, optionally, by a PLC. As a result of the energizing of valve 500 the direction of air flow through valve 500 is switched resulting in the first side of each initial blow valve being closed at stage 901, and the second side of each initial blow valve being opened at stage 902. Compressed air from air source 401 is then transported through each initial blow valve and each main blow valve at stage 903. Ultimately, compressed air flows from each main blow valve, through each quick exhaust valve, and into the plurality of moulds situated at the plurality of points of use 102 at stage 904. The molten material to be deformed at each point of use, and in particular each blow moulding pin, is blown to an initial blow state at stage 905 as a result of the incident compressed air. The initial blow state being the pre-forming of the receptacle.

Figure 10:
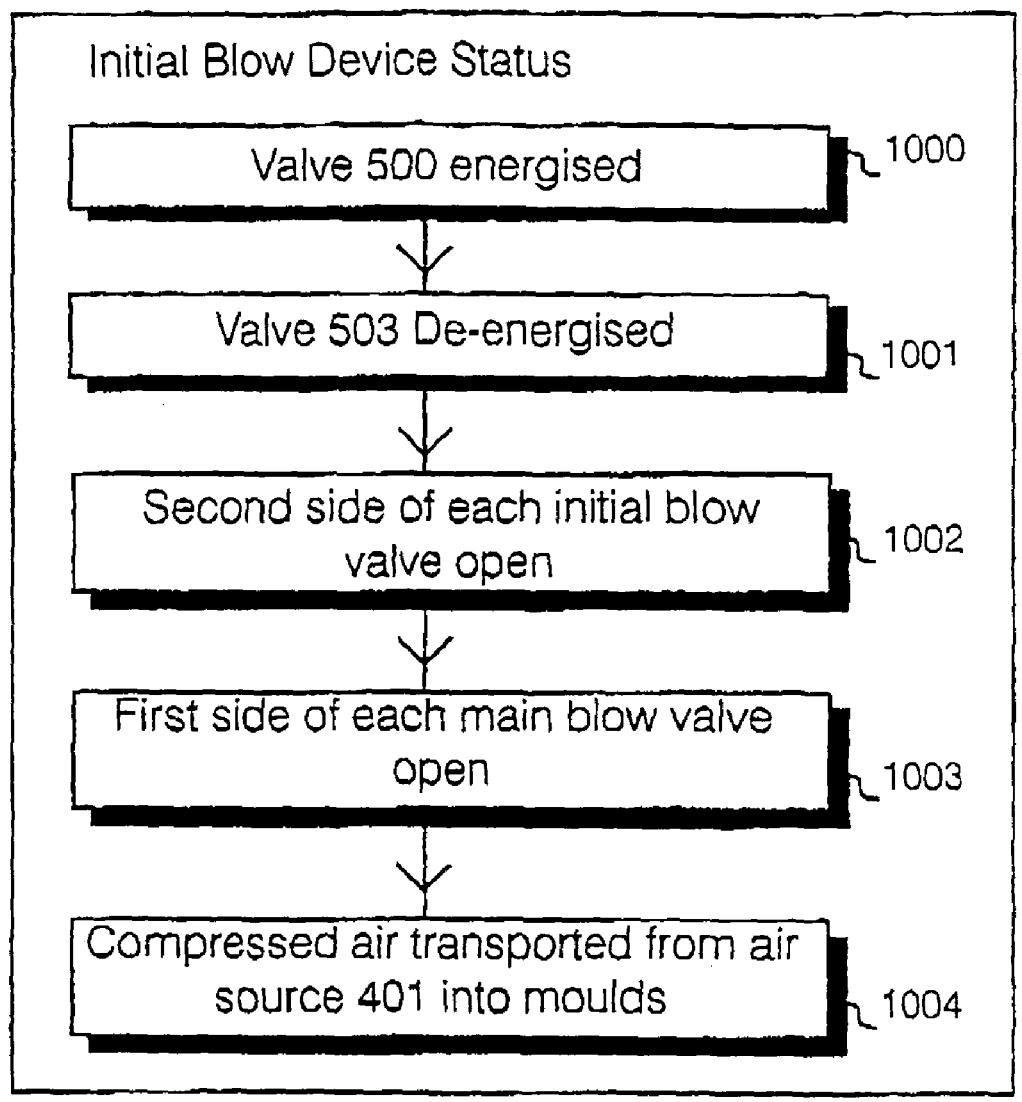
FIG. 10 illustrates a status of the device according to a specific implementation following an initial blow.

Following the initial blow operation as detailed in FIG. 9 the status of the blow moulding device according to the specific implementation is detailed with reference to FIG. 10. Valve 500 is energized at status 1000, control valve 503 being de-energized at status 1001. The second side of each initial blow valve is open at status 1002 and the first side of each main blow valve being open at status 1003. As a consequence, compressed air is transported from air source 401 to the plurality of points of use 102 within the plurality of moulds at status 1004.

Figure 11:
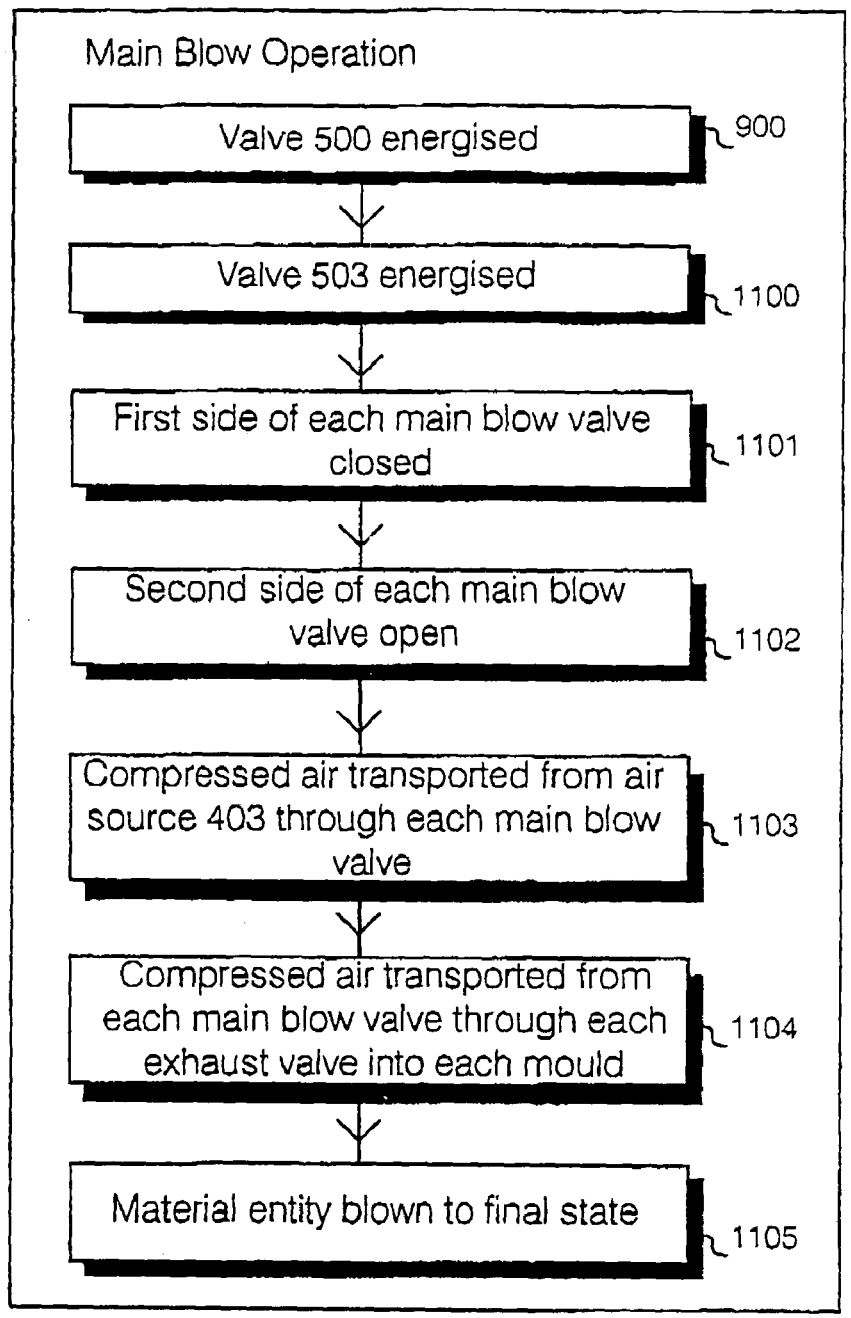
FIG. 11 illustrates a main blow operation according to one specific implementation.

Referring to FIG. 11 there is illustrated the main blow operation of the blow moulding device according to the specific implementation. Valve 500 remains energized at stage 900, valve 503 is also energized at stage 1100 resulting in the first side of each main blow valve being closed at stage 1101 and the second side of each main blow valve being opened at stage 1102. As a consequence, compressed air is transported from air source 403 through each main blow valve at stage 1103, through each quick exhaust valve and into each of the plurality of moulds at the plurality of points of use at stage 1104. The receptacle is forced against the inside walls of the mould cavity 103, thereby forming an entity in a final blown state at stage 1105.

Figure 12:
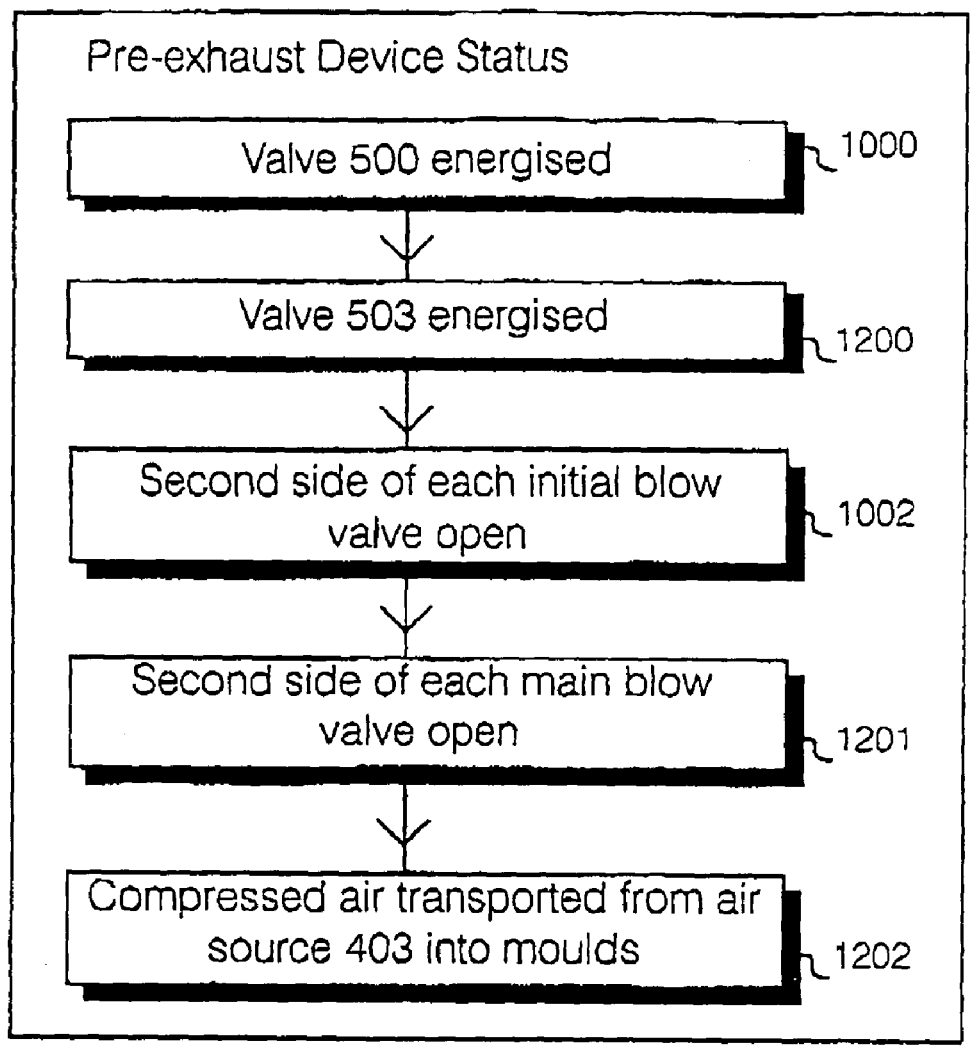
FIG. 12 illustrates a pre-exhaust status of the device according to a specific implementation.

Following the main blow operation as detailed with reference to FIG. 11, the pre-exhaust device status is illustrated with reference to FIG. 12 according to the specific implementation. Valve 500 is energized at status 1000 together with valve 503 at status 1200. Accordingly, the second side of each initial blow valve is open at status 1002 as a result of the energized valve 500 and the second side of each main blow valve is open at status 1201 as a result of the energized valve 503. Consequently, air is provided at the plurality of points of use from air source 403 and transported into the moulds at status 1202.

Figure 13:
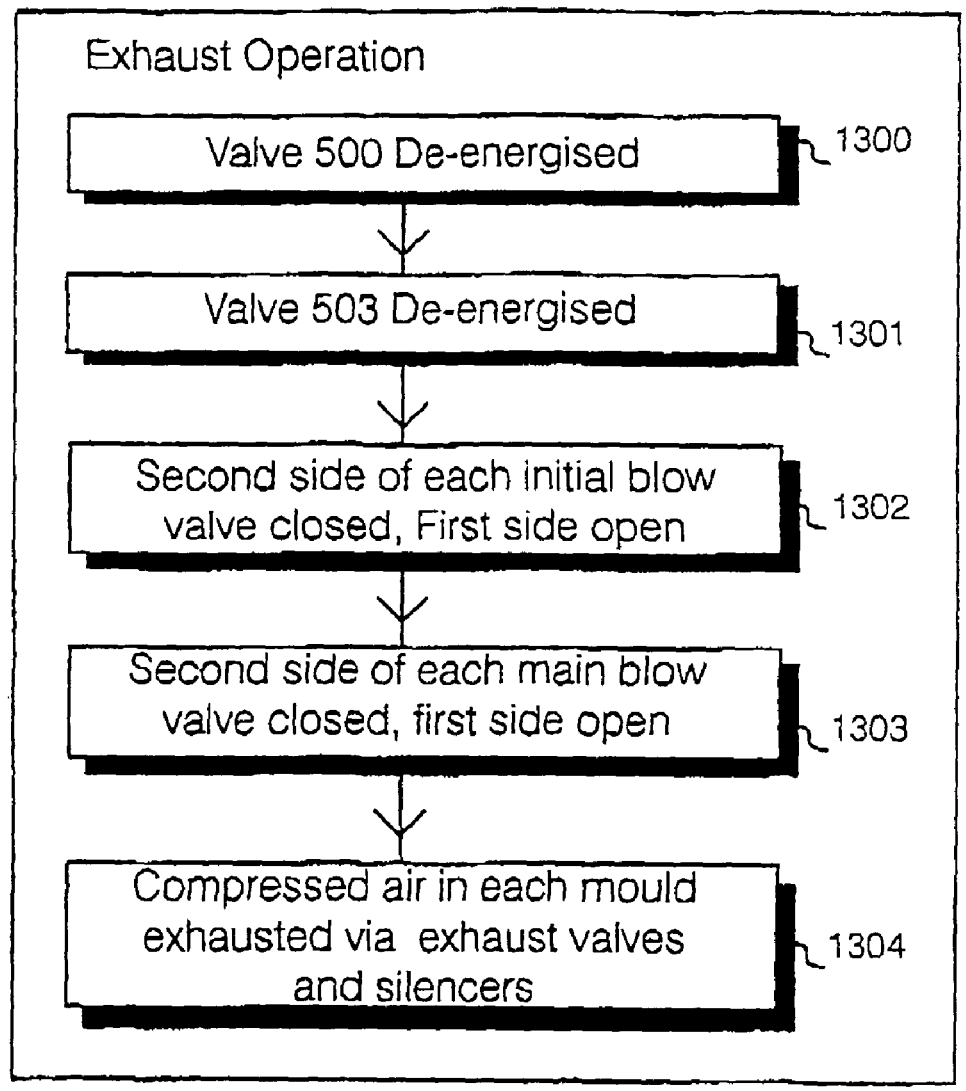
FIG. 13 illustrates an exhaust operation of the device according to a specific implementation.

Referring to FIG. 13 there is illustrated the exhaust operation of compressed air from within the plurality of moulds at the plurality of points of use 102 according to the specific implementation of the present invention. Valve 500 is de-energized at stage 1300 together with valve 503 at stage 1301. Accordingly, the second side of each initial blow valve is closed while the first side is opened as a result of the de-energizing of valve 500 at stage 1302. Additionally, the second side of each main blow valve is closed, while the first side is opened as a result of the de-energizing of valve 503 at stage 1303. Due to the de-energizing of both control valve 500 and 503 compressed air from within the plurality of moulds is exhausted via the exhaust valves 300 at stage 1304. Silencers may be provided on each quick exhaust valve so as to reduce level of noise when exhausting compressed air into the atmosphere. In any one exhaust operation as detailed with reference to FIG. 13 compressed air within the main blow manifold 402 and the initial blow manifold 400 is not exhausted as a consequence of the specific implementation of the present invention.

Figure 14:
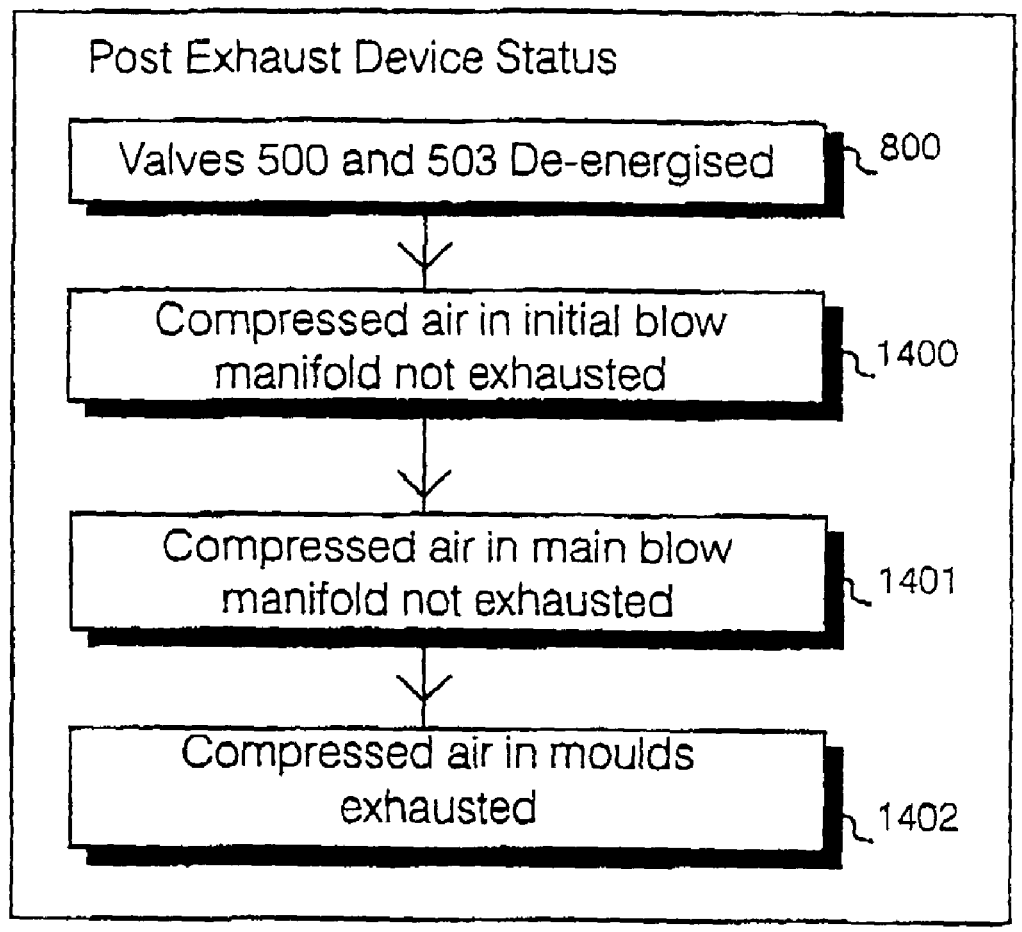
FIG. 14 illustrates a post exhaust status of the device according to a specific implementation.
Figure 15:
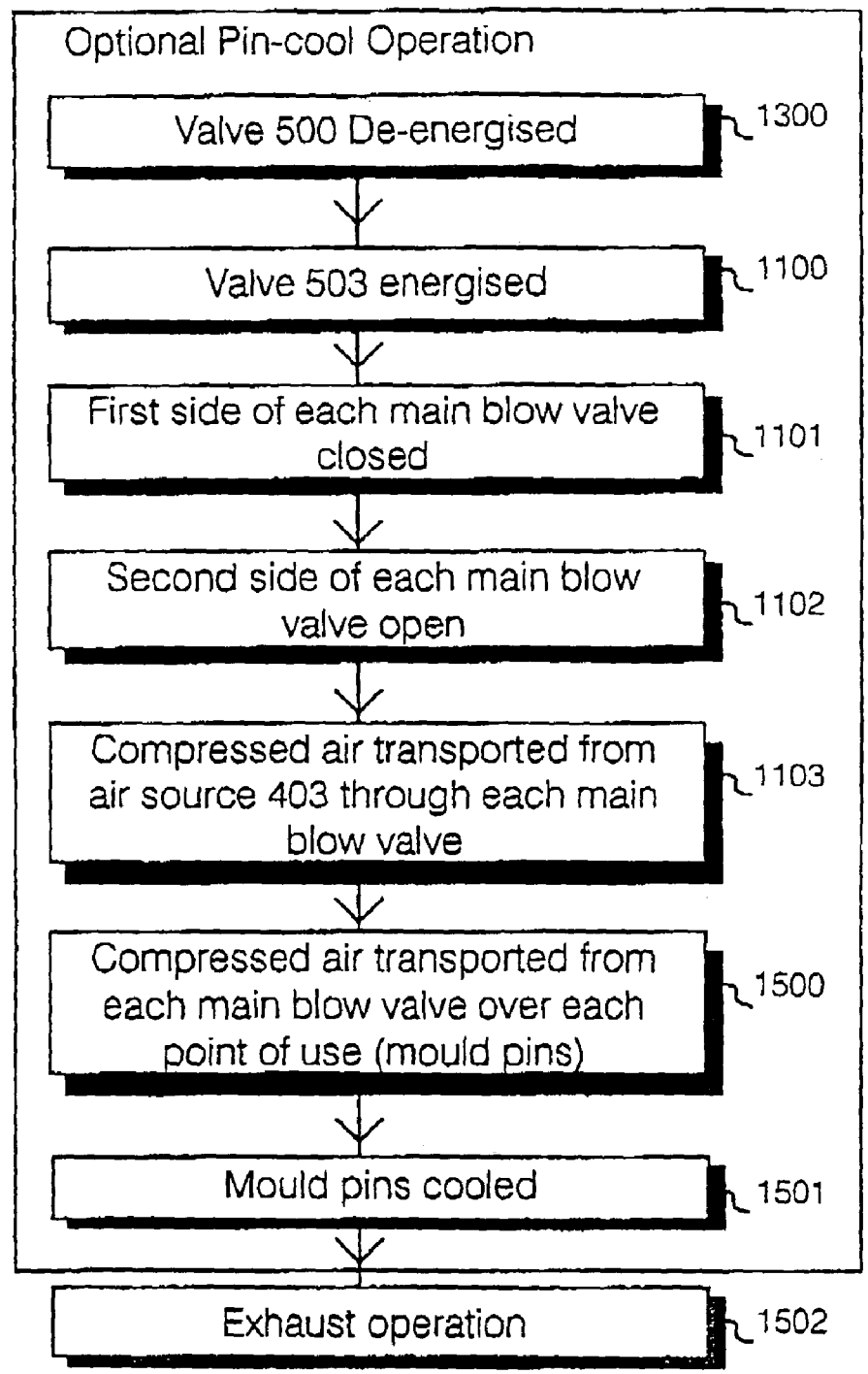
FIG. 15 illustrates an optional pin cool operation of the device according to a specific implementation.

Referring to FIG. 14 there is illustrated the post exhaust status of the blow moulding device according to the specific implementation. Control valves 500 and 503 are de-energized at status 800 such that compressed air cannot be transported into the moulds. Compressed air in the initial blow manifold is not exhausted at status 1400 together with compressed air in the main blow manifold not being exhausted at status 1401. Compressed air from within the plurality of moulds located at the points of use 102 is exhausted by the plurality of exhaust valves 300 positioned in close proximity to the points of use 102 at status 1402.

Optionally, a pin cool operation may be performed as part of the blow moulding cycle using the blow moulding device according to the specific implementation. The purpose of the mould pin cool operation is to reduce the temperature of the mould pins following the initial blow and main blow operations. Control valve 500 is de-energized at stage 1300 while valve 503 is energized at stage 1100. As a consequence of the energizing of valve 503, the first side of each main blow valve is closed at stage 1101 while the second side of each valve is opened at stage 1102. Accordingly, compressed air is transported from air source 403 to each main blow valve at stage 1103 and over the plurality of mould pins being located at the plurality of points of use 102 at stage 1500. The mould pins are cooled at stage 1501 due to the passage of compressed air over their surface. The compressed air now present within the plurality of moulds as a result of the pin cool operation is exhausted at stage 1502 according to the exhaust operation as detailed with reference to FIG. 13.

According to the blow moulding process as detailed with reference to FIGS. 7 to 15 according to the specific implementation, a method is provided for the providing and exhausting of compressed air at a plurality of points of use, involving the providing of compressed air to the points of use from a first and a second compressed air source. The transporting and effecting a provision of compressed air from the first compressed air source 401 is possible due to the utilization of the initial blow system as detailed with reference to FIG. 5. Additionally, the transporting and the effecting a provision of compressed air from the second compressed air source 403 is possible due to the utilization of the main blow system as detailed with reference to FIG. 5. Through the utilization of the specific implementation of the present invention, the exhausting of compressed air at the points of use is provided while compressed air within the initial blow system, main blow system, or blow moulding device manifold is not exhausted. In addition to the supplying of compressed air from the first compressed air source 401 at a pressure substantially within the range $1 \times 10^5$ Pa to $5 \times 10^5$ Pa, and the supplying of compressed air from the second compressed air source 403 at a pressure of substantially $5.5 \times 10^5$ Pa, further compressed air is supplied to the plurality of points of use as detailed in the pin cool operation with reference to FIG. 15. This further compressed air being exhausted at the points of use without resort to the exhausting of compressed air within the initial and main blow manifolds.

Figure 16:
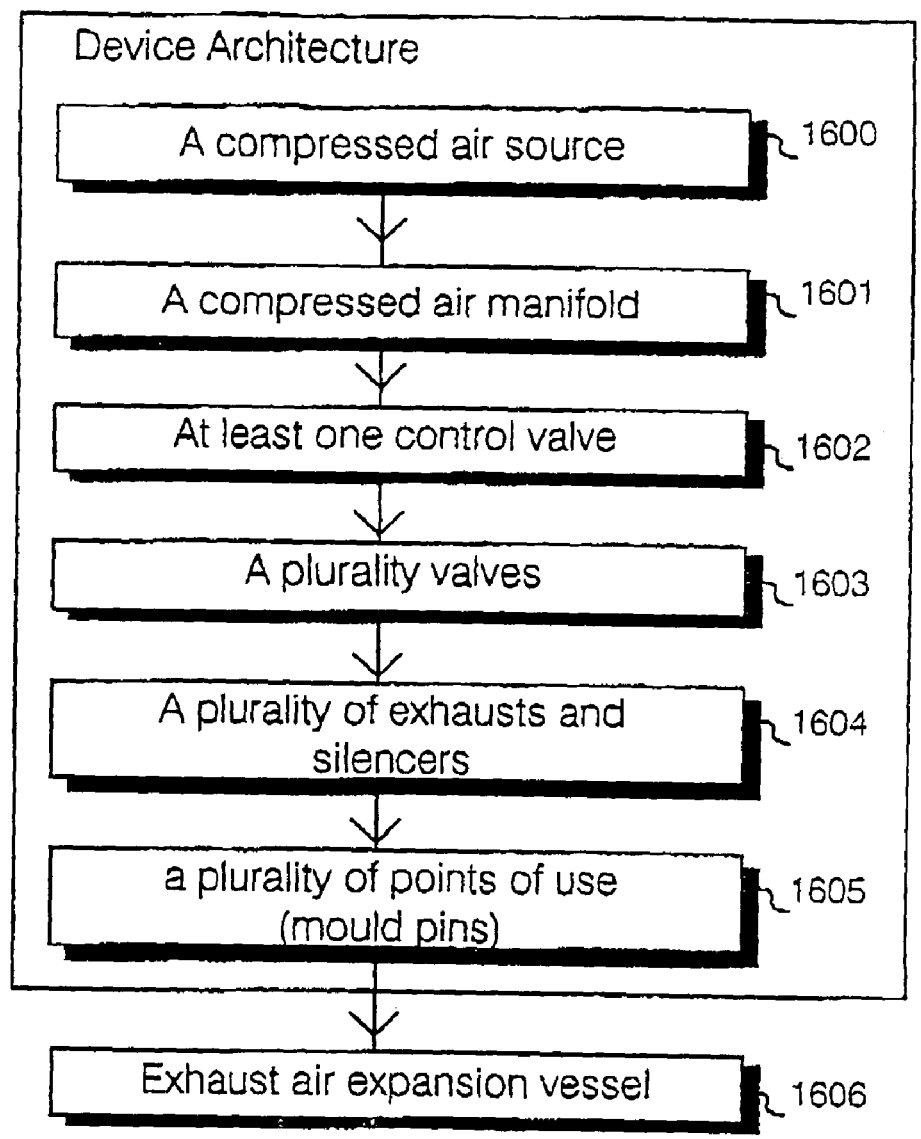
FIG. 16 illustrates a blow moulding device architecture according to a further specific implementation.

According to a further specific implementation of the present invention there is provided a blow moulding device configured to provide and exhaust compressed air at a plurality of points of use involving the providing of compressed air from a single compressed air source as detailed with reference to FIG. 16.

The further specific implementation comprises a single compressed air source 1600, this compressed air source being configurable to supply or provide compressed air at relatively high pressures within the range $2.5 \times 10^6$ Pa to $4.5 \times 10^6$ Pa and the relative low compressed air pressure of substantially $5.5 \times 10^5$ Pa. The relative high pressure implementation being usable to blow mould HDPs, polyethene, glass and the like, while the relative low pressure implementation is usable with LDPs, easily deformable materials and the like. Each relative high and low pressure implementation utilizing a similar configuration and array of components as detailed with reference to the specific implementation detailed in FIGS. 4 to 15. Accordingly, the further specific implementation comprises a compressed air manifold to allow a transporting of the compressed air from the compressed air source 1600 to a plurality of points of use 1605. The further specific implementation also comprises a plurality of valves to effect the providing and exhausting of compressed air at the points of use, the plurality of valves comprising at least one control valve 1602 to control a plurality of pilot operated valves 1603. A plurality of exhaust valves and silencers are provided 1604 to allow exhausting of the compressed air at the plurality of points of use. Optionally, the further specific implementation may comprise an exhaust air expansion vessel 1606 being connected to the plurality of points of use, the exhaust air expansion vessel being configured with at least one exhaust such that compressed air exhausted from the plurality of points of use can be expanded within vessel 1606 and subsequently exhausted through its exhaust valve. This further specific implementation has the benefit of exhausting compressed air at a reduced pressure compared with the exhausting of compressed air directly at the points of use in the event of the use of compressed air at pressure substantially within the range $2.5 \times 10^6$ Pa to $4.5 \times 10^6$ Pa.

Figure 17:
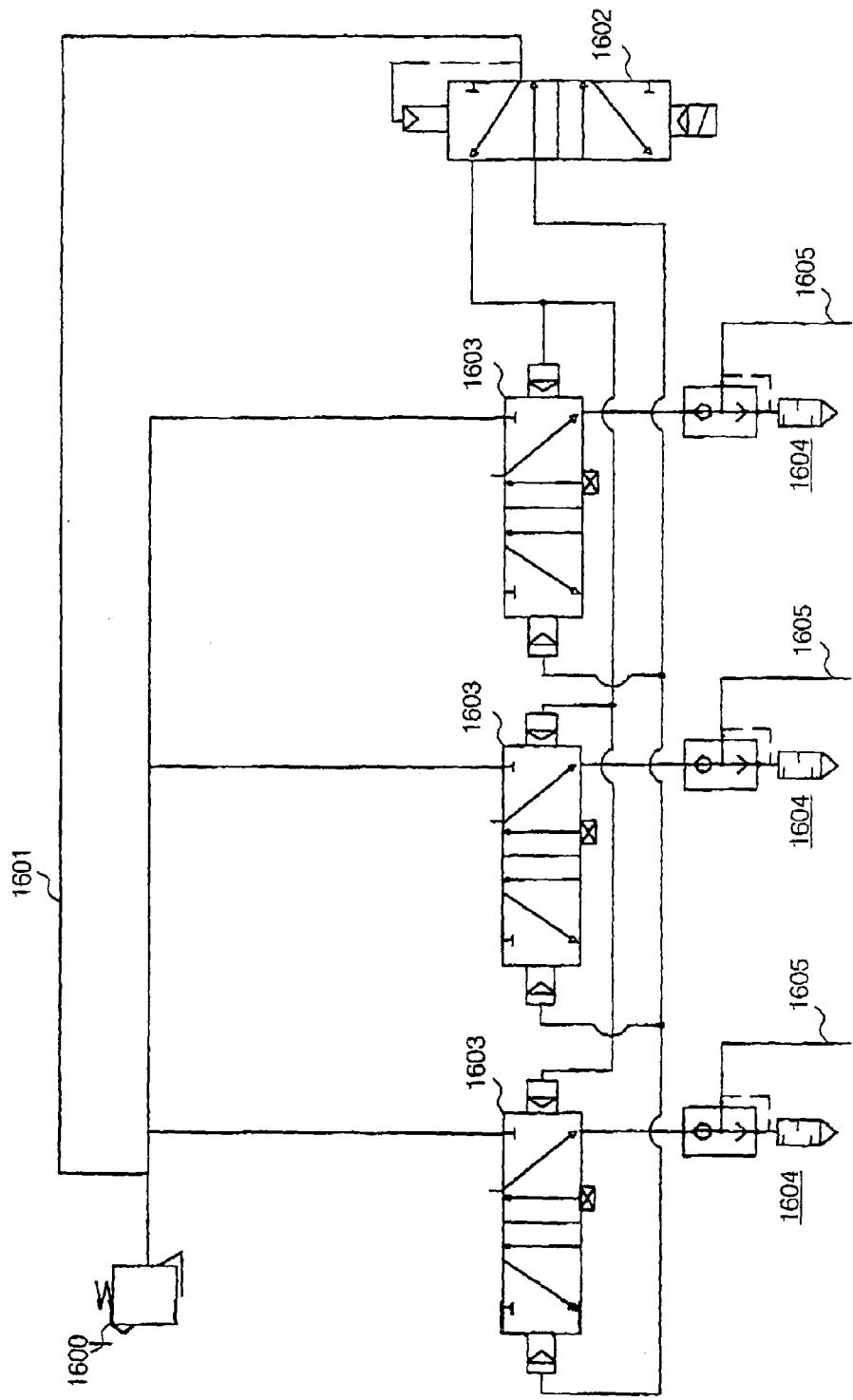
FIG. 17 illustrates a further specific embodiment of the present invention having a plurality of valves and points of use.

Referring to FIG. 17 there is illustrated a plan view of the blow moulding device according to the further specific implementation comprising a compressed air source 1600, a compressed air manifold 1601, at least one control valve 1602, a plurality of valves 1603, a plurality of exhausts 1604 and a plurality of points of use 1605. The operational nature of the device according to the further specific implementation is akin to the operational nature of the device with reference FIGS. 4 to 15, in that the solenoid control valve 1602 may be energized by a suitable PLC such that the supply of compressed air to a first side of each pilot operated valve 1603 is switched to a second side as a result of the energizing of control valve 1602. Accordingly, and as detailed with reference to FIGS. 8 to 15, compressed air may be transported and provided to the plurality of points of use 1605 and thereby exhausted at these points of use together with the non exhausting of compressed air within the manifold 1601. Manifold 1601 comprises all connecting tubing between components 1600, 1602, 1603 and 1604.

Figure 18:
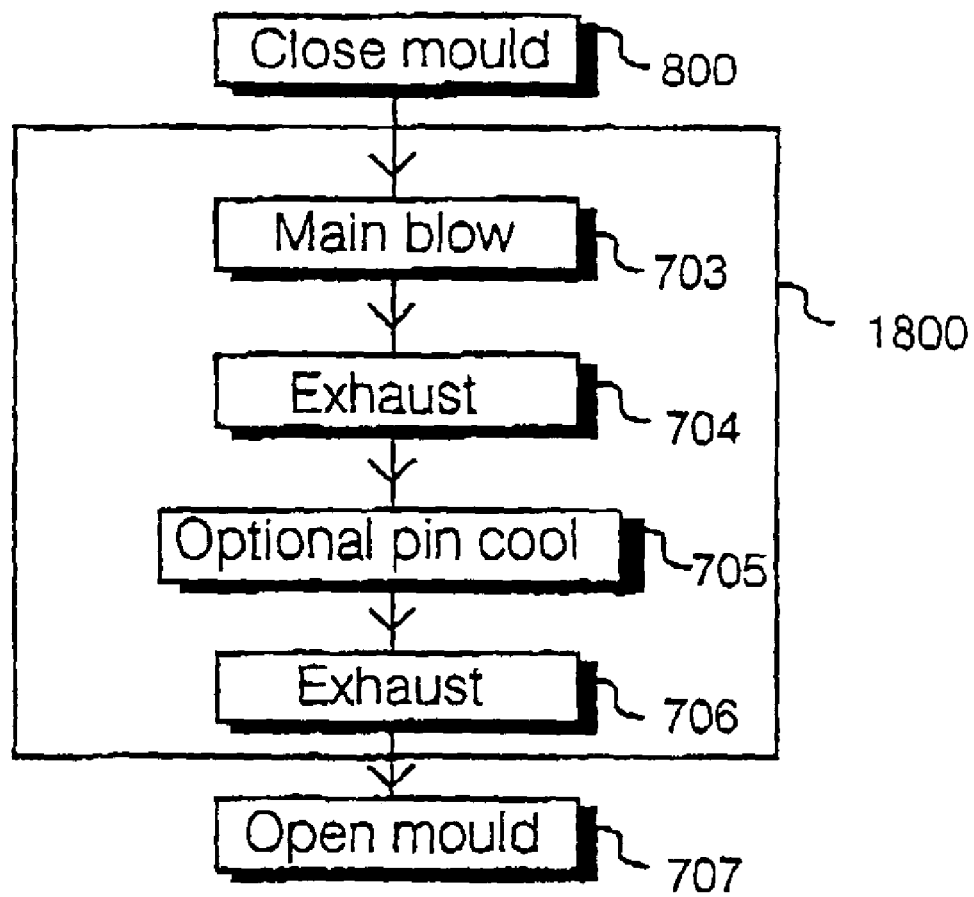
FIG. 18 illustrates a flow diagram detailing the operation of the device according to a further specific implementation.

The blow moulding device according to the further specific implementation, being similar in operation to the device as detailed with reference to FIG. 7 is configured to perform a series of blow moulding cycles starting with the closing of the mould at stage 700 with reference to FIG. 18. The blow moulding cycle 1800 is then initiated comprising a main blow 703 as detailed, in part with reference to FIG. 11, involving the use of a single control valve. Compressed air at the points of use is then exhausted at stage 704 as detailed, in part, with reference to FIG. 13. Optionally, a pin cool operation may be undertaken at stage 705 as detailed with reference to FIG. 15, this requiring an additional exhaust operation 706 again, as detailed with reference to FIG. 13. Following the completion of blow moulding cycle 1800 the mould cavity may be opened at stage 707 to remove the deformed, moulded or blown receptacle.

The utilization of a blow moulding cycle as detailed at stage 1800, without the initial blow moulding stage 702 as detailed with reference to FIG. 7, is advantageous over the process as detailed with reference to FIG. 7 when a receptacle, requiring to be blown, can be done so without the need for a multiple blow moulding operation, involving the use of an initial blow operation. For example, moulded receptacles having a simple geometric shape (i.e. without any handles) may be moulded using the blow moulding device according to the further specific implementation and operation as detailed with reference to FIG. 18.

Figure 19:
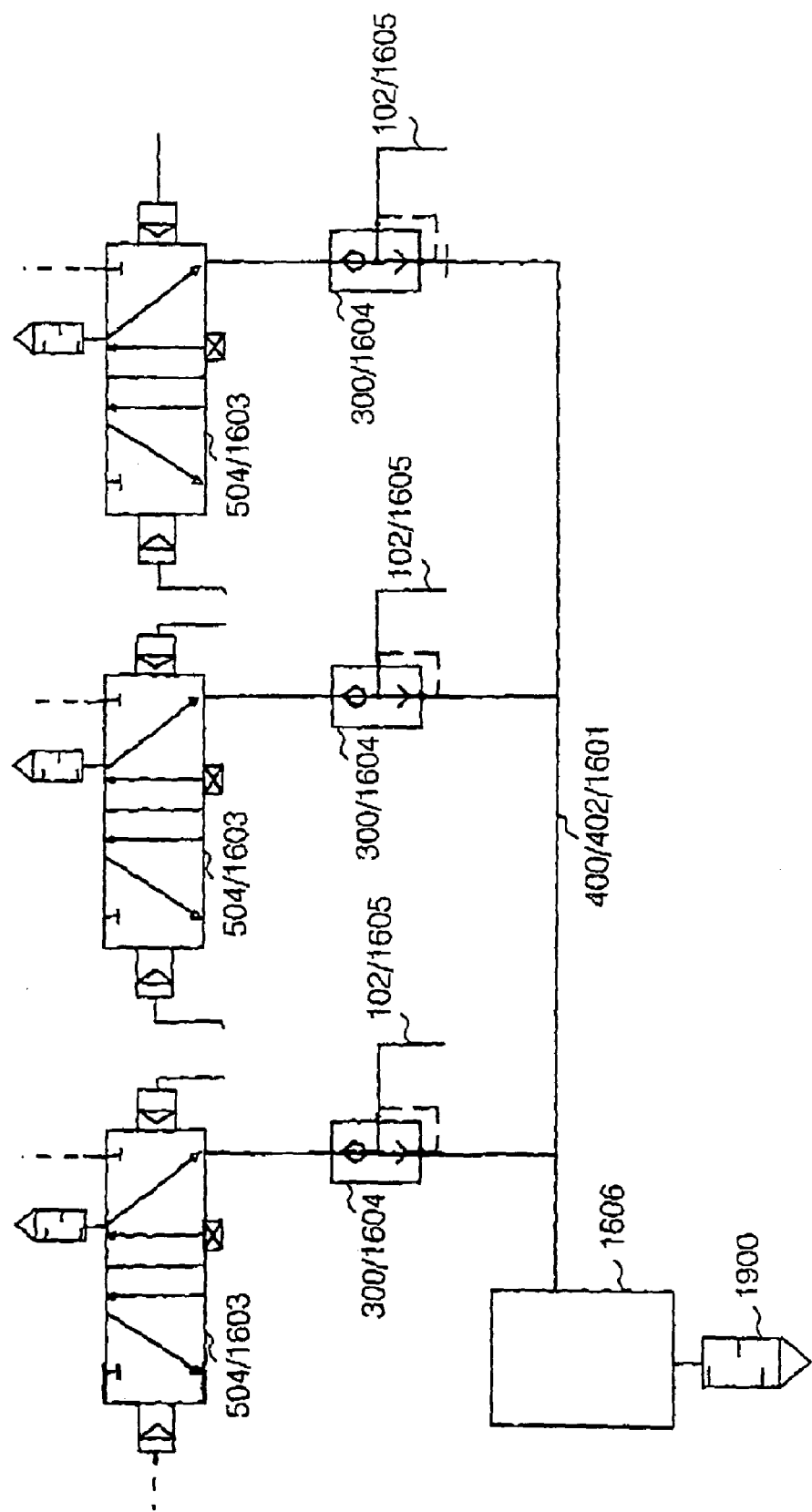
FIG. 19 illustrates an expansion vessel being connected to a plurality of points of use according to one embodiment of the present invention.

With reference to FIG. 19 there is illustrated an exhaust air expansion vessel 1606 being connected to the plurality of points of use 102/1605 via the plurality of exhausts 300/1604. The exhaust valves being connected to the plurality of pilot operated valves 504/1603. The expansion vessel 1606 comprises an exhaust 1900 fitted with a suitable silencer such that exhausted compressed air, from exhaust valves 300/1604, positioned at the points of use, is expanded within the expansion vessel and exhausted by exhaust valve 1900. The connecting of expansion vessel 1606 to the points of use is via tubing, forming manifold(s) 400/402/1601. The utilization of expansion vessel 1606, useable with the specific implementation and further specific implementations of the present invention reduces the pressure of the compressed air previously contained within the plurality of moulds 103 prior to a final exhausting of compressed air into the atmosphere. With reference to FIG. 7 the exhausting of compressed air into the expansion vessel 1606 occurs following stage 704 and stage 706 within the blow moulding cycle 701. Similarly, the exhausting of compressed air into expansion vessel 1606 occurs following stage 704 and stage 706 within cycle 1800 as detailed with reference to FIG. 18 according to the further specific implementation of the present invention.

The invention claimed is:

1. A blow moulding device configured to provide and exhaust compressed air at a plurality of points of use (102, 1605), said device comprising:
   a compressed air source (401,403, 1600) for providing compressed air at said points of use;
   a plurality of quick exhaust valves (300, 1604) positioned at said points of use for exhausting said compressed air;
   a compressed air manifold (400, 402, 1601) to allow a transporting of said compressed air to said points of use;
   a plurality of valves (501, 504, 1603) to effect said providing and exhausting of said compressed air;
   said device further comprising and characterised by:
   in operation, following blow moulding of a material at said plurality of points of use, compressed air contained within each mould cavity is exhausted via said plurality of quick exhaust valves (300, 1604), however, compressed air from within said compressed air manifold remains pressurized and is not exhausted and the manifold is not replenished by compressed air from said each mould cavity; and at least one control valve (500, 503, 1602) to control said plurality of valves wherein a blow moulding cycle time is reduced.

2. The device as claimed in claim 1, wherein said plurality of valves comprise a plurality of pilot operated valves to effect said providing and exhausting of said compressed air; and
   said at least one control valve comprises a solenoid control valve to control said plurality of pilot operated valves.

3. The device as claimed in claim 1, wherein in use said plurality of points of use are positioned within a plurality of moulds (103), said compressed air being provided to said moulds, said compressed air within said moulds being exhausted using said exhaust valves and said plurality of valves;
   wherein compressed air within said manifold is not exhausted.

4. The device as claimed in claimed in claim 3 wherein said solenoid control valve comprises a 3 and 4 directional solenoid control valve being operable to control the plurality of pilot operated valves.

5. The device as claimed in claim 1 wherein said device further comprises a PLC, said PLC being configured to control said control valve;
   wherein air flow through each of said plurality of valves may be provided or terminated by an energising of said control valve using said PLC.

6. The device as claimed in claim 5 wherein said control valve is configured to be energised and de-energised through the supply of an electrical signal from said PLC;
   wherein said plurality of valves comprise pneumatic valves, said pneumatic valves being controlled by an energising and de-energising of said control valve.

7. The device as claimed in claims 5 wherein said blow moulding cycle is controlled by:
   an electrical signal being transferred from said PLC to said control valve;
   an energising and de-energising of said control valve; and
   a providing and terminating of air flow through said plurality of valves;
   wherein a reduction in said blow moulding cycle time is provided.

8. The device as claimed in claim 1, further comprising:
   an exhaust air expansion vessel (1606) being connected to said plurality of points of use, said expansion vessel comprising at least one exhaust valve (1900);
   wherein exhausted compressed air is expanded within said expansion vessel and exhausted by said at least one exhaust valve.

9. The device as claimed in claim 1, wherein said exhaust valves are configured with silencers.

10. The device as claimed in claim 1, wherein said device is configurable to provide said compressed air at said plurality of points of use at a pressure substantially within the range $2.5 \times 10^6$ Pa to $4.5 \times 10^6$ Pa.

11. The device as claimed in claim 1, wherein said device is configurable to provide said compressed air at said plurality of points of use at a pressure of the substantially $5.5 \times 10^5$ Pa.

12. A blow moulding device configured to provide and exhaust compressed air at a plurality of points of use (102), said device comprising:
   a first and a second compressed air source (401, 403) for providing compressed air to said points of use;
   a plurality of quick exhaust valves (300) positioned at said points of use for exhausting said compressed air;
   an initial blow manifold (400) and main blow manifold (402) to allow a transporting of said compressed air to said points of use.
   a plurality of initial blow valves (501) to effect a providing of said compressed air from said first compressed air source to said points of use;
   a plurality of main blow valves (504) to effect a providing of said compressed air from said second compressed air source to said points of use;
   said device further comprising and characterised by:
   at least one initial blow control valve (500) to control said plurality of initial blow valves; and
   at least one main blow control valve (503) to control said plurality of main blow valves such that following blow moulding of a material at said plurality of points of use, compressed air contained within each mould cavity is exhausted via said plurality of quick exhaust valves (300), however, compressed air from within said initial blow manifold is not exhausted and is not replenished by compressed air from said each mould cavity;
   wherein a blow moulding cycle time is reduced.

13. The device as claimed in claim 12, wherein said plurality of initial and main blow valves comprise a plurality of pilot operated valves to effect said providing and exhausting of said compressed air; and said at least one initial and main blow control valve comprises a solenoid control valve to control said plurality of pilot operated valves.

14. The device as claimed in claim 12, wherein in use said plurality of points of use are positioned within a plurality of moulds (103), said compressed air being provided to said moulds, said compressed air within said moulds being exhausted using said exhaust valves, said initial blow valves and said main blow valves, wherein compressed air within each said manifold is not exhausted.

15. The device as claimed in claim 13 wherein each said solenoid control valve comprises a 3 and 4 directional solenoid control valve being operable to control said plurality of pilot operated valves.

16. The device as claimed in claim 12 wherein said device further comprises a PLC, said PLC being configured to control each said control valve;
wherein air flow through each of said plurality of initial and main blow valves may be provided or terminated by an energising of each said initial and main blow control valve using said PLC.

17. The device as claimed in claim 16 wherein each said initial and main blow control valve is configured to be energised and de-energised through the supply of an electrical signal from said PLC;
wherein said plurality of initial and main blow valves comprise pneumatic valves, said pneumatic valves being controlled by an energising and de-energising of each said initial and main blow control valve.

18. The device as claimed in claim 16 wherein said blow moulding cycle is controlled by:
an electrical signal being transferred from said PLC to each said initial and main blow control valve;
an energising and de-energising of each said initial and main blow control valve; and
a providing and terminating of air flow through said plurality of initial and main blow valves;
wherein a reduction in said blow moulding cycle time is provided.

19. The device as claimed in claim 12 wherein said plurality of initial blow valves comprise:
a plurality of initial blow pilot operated valves to effect said providing and exhausting of said compressed air; and
said at least one initial blow control valve comprises:
at least one initial blow solenoid control valve to control said plurality of initial blow pilot operated valves.

20. The device as claimed in claim 19 wherein said plurality of main blow valves comprise:
a plurality of main blow pilot operated valves to effect said providing and exhausting of said compressed air; and
said at least one main blow control valve comprises:
at least one main blow solenoid control valve to control said plurality of said main blow pilot operated valves.

21. The device as claimed in claim 12 further comprising:
an exhaust air expansion vessel (1606) being connected to said plurality of points of use, said expansion vessel comprising at least one exhaust valve (1900);
wherein exhausted compressed air is expanded within said expansion vessel and exhausted by said at least one exhaust valve.

22. The device as claimed in claim 12, wherein said exhaust valves are configured with silencers.

23. The device as claimed in claim 12, wherein said device is configurable to provide compressed air at said points of use using said first compressed air source at a pressure substantially within the range $1\times10^5$ Pa to $5\times10^5$ Pa; and to provide compressed air at said points of use using said second compressed air source at a pressure of substantially $5.5\times10^5$ Pa.

24. The device as claimed in claim 12, further comprising restrictor valves (506) configured to restrict the transporting of said compressed air from said first compressed air source.

25. A method of providing and exhausting compressed air at a plurality of points of use (102, 1605), said method comprising:
using a blow moulding device configured to provide and exhaust compressed air at the plurality of points of use (102, 1605), said device comprising:
a compressed air source (401, 403, 1600) for providing compressed air at said points of use;
a plurality of quick exhaust valves (300, 1604) positioned at said points of use for exhausting said compressed air;
a compressed air manifold (400, 402, 1601) to allow a transporting of said compressed air to said points of use;
a plurality of valves (501, 504, 1603) to effect said providing and exhausting of said compressed air; and
at least one control valve (500, 503, 1602) to control said plurality of valves;
providing compressed air at said points of use from said compressed air source (401, 403, 1600);
exhausting said compressed air at said points of use using said plurality of exhaust valves (300, 1604) positioned at said points of use;
transporting said compressed air to said points of use using said compressed air manifold (400, 402, 1601);
effecting said providing and exhausting of said compressed air at said points of use using said plurality of valves (501, 504, 1603);
said method being characterised by:
controlling said plurality of valves using said at least one control valve (500, 503, 1602) to reduce a blow moulding cycle such that following blow moulding of a material at said plurality of points of use, compressed air contained within each mould cavity is exhausted via said plurality of quick exhaust valves (300, 1604), however, compressed air from within said compressed air manifold remains pressurized and is not exhausted and the manifold is not replenished by compressed air from said each mould cavity.

26. The method as claimed in claim 25, further comprising:
positioning said points of use within a plurality of moulds (103);
providing said compressed air at said moulds;
exhausting said compressed air within said moulds using said exhaust valves; and
not exhausting compressed air within said manifold.

27. The method as claimed in claim 25, further comprising:
controlling said at least one control valve using a PLC;
energising and de-energising said at least one control valve using said PLC;
providing and terminating airflow through each of said plurality of valves by said energising and de-energising of said at least one control valve.

28. The method as claimed in claim 27, wherein said plurality of valves comprise a plurality of pilot operated valves to effect said providing and exhausting of said compressed air; and
said at least one control valve comprises a solenoid control valve to control said plurality of pilot operated valves.

29. The method as claimed in claims 25, further comprising:
exhausting said compressed air from said points of use to an exhaust air expansion vessel (1606);

expanding said compressed air in said vessel;
exhausting air within said vessel using at least one exhaust valve (1900).

30. A method of providing and exhausting compressed air at a plurality of points of use (102), said method comprising:
using a blow moulding device configured to provide and exhaust compressed air at the plurality of points of use (102), said device comprising:
a first and a second compressed air source (401, 403) for providing compressed air to said points of use;
a plurality of quick exhaust valves (300) positioned at said points of use for exhausting said compressed air;
an initial blow manifold (400) and main blow manifold (402) to allow a transporting of said compressed air to said points of use;
a plurality of initial blow valves (501) to effect a providing of said compressed air from said first compressed air source to said points of use;
a plurality of main blow valves (504) to effect a providing of said compressed air from said second compressed air source to said points of use;
at least one initial blow control valve (500) to control said plurality of initial blow valves; and
at least one main blow control valve (503) to control said plurality of main blow valves;
providing compressed air at said points of use from a first and a second compressed air source (401, 403);
exhausting said compressed air at said points of use using said plurality of quick exhaust valves (300, 1604) positioned at said points of use;
transporting said compressed air to said points of use using an initial blow manifold (400) and a main blow manifold (402);
effecting said providing and exhausting of said compressed air at said points of use using a plurality of initial blow valves (501) and a plurality of main blow valves (504);
said method characterised by:
controlling said plurality of initial blow valves using at least one initial blow control valve (500) and controlling said plurality of main blow valves using at least one main blow control valve (503) to reduce a blow moulding cycle time such that, following blow moulding of a material at said plurality of points of use, compressed air contained within each mould cavity is exhausted via said plurality of quick exhaust valves (300, 1604), however, compressed air from within said initial blow manifold or said main blow manifold remains pressurized, is not exhausted, and is not replenished by compressed air from said points of use.

31. The method as claimed in claim 29, further comprising:
positioning said points of use within a plurality of moulds (103);
providing said compressed air at said moulds;
exhausting said compressed air within said moulds using said exhaust valves; and
not exhausting compressed air within said initial blow manifold and said main blow manifold.

32. The method as claimed in claim 30, further comprising:
providing further compressed air at said moulds;
exhausting said further compressed air within said moulds using said exhaust valves; and
not exhausting compressed air within said initial blow manifold and said main blow manifold.

33. The method as claimed in claim 32, further comprising:
controlling said at least one initial blow control valve and said main blow control valve using a PLC;
energising and de-energising said at least one initial blow control valve and said main blow control valve using said PLC;
providing and terminating airflow through each of said plurality of initial and main blow valves by said energising and de-energising of said at least one initial control valve and said main blow control valve.

34. The method as claimed in claim 30, wherein said plurality of initial blow valves and said main blow valves comprise a plurality of pilot operated valves to effect said providing and exhausting of said compressed air; and
said at least one initial blow control valve and said at least one main blow control valve each comprise a solenoid control valve to control said plurality of pilot operated valves.

35. The method as claimed in claim 30, further comprising:
exhausting said compressed air from said points of use to an exhaust air expansion vessel (1606);
expanding said compressed air in said vessel;
exhausting air within said vessel using at least one exhaust valve (1900).

36. The method as claimed in claim 30, wherein said step of effecting said providing and exhausting of said compressed air at said points of use comprises:
controlling a plurality of initial blow pilot operated valves (501) using an initial blow solenoid control valve (500);
controlling said exhausting of said compressed air at said points of use using said initial blow pilot operated valves;
controlling a plurality of main blow pilot operated valves (504) using a main blow solenoid control valve (503); and
controlling said exhausting of said compressed air at said points of use using said main blow pilot operated valves.

* * * * *